US008103408B2

(12) United States Patent
Inoue et al.

(10) Patent No.: US 8,103,408 B2
(45) Date of Patent: Jan. 24, 2012

(54) SUSPENSION SYSTEM FOR VEHICLE

(75) Inventors: Hirofumi Inoue, Toyota (JP); Takuhiro Kondo, Kani (JP); Yoshihiro Suda, Ota-ku (JP)

(73) Assignees: Toyota Jidosha Kabushiki Kaisha, Toyota-shi (JP); Kayaba Industry Co., Ltd., Tokyo (JP); The University of Tokyo, Tokyo (JP)

( * ) Notice: Subject to any disclaimer, the term of this patent is extended or adjusted under 35 U.S.C. 154(b) by 917 days.

(21) Appl. No.: 12/091,385

(22) PCT Filed: Oct. 25, 2006

(86) PCT No.: PCT/JP2006/321227
§ 371 (c)(1),
(2), (4) Date: Apr. 24, 2008

(87) PCT Pub. No.: WO2007/049633
PCT Pub. Date: May 3, 2007

(65) Prior Publication Data
US 2009/0273147 A1 Nov. 5, 2009

(30) Foreign Application Priority Data
Oct. 26, 2005 (JP) .................................. 2005-311953

(51) Int. Cl.
*B60G 17/015* (2006.01)
(52) U.S. Cl. ........... 701/37; 701/36; 280/5.5; 280/5.505
(58) Field of Classification Search ............... 701/36–37
See application file for complete search history.

(56) References Cited

U.S. PATENT DOCUMENTS

| | | | | |
|---|---|---|---|---|
| 3,752,497 A * | 8/1973 | Enke et al. | ................. | 280/5.509 |
| 4,634,143 A * | 1/1987 | Asami et al. | ............... | 280/5.503 |
| 4,647,068 A * | 3/1987 | Asami et al. | ............... | 280/5.517 |
| 5,447,332 A * | 9/1995 | Heyring | ................. | 280/124.104 |
| 5,601,307 A * | 2/1997 | Heyring et al. | ............ | 280/6.157 |
| 6,942,230 B1* | 9/2005 | Fontdecaba Buj | ..... | 280/124.104 |
| 7,168,720 B2* | 1/2007 | Fontdecaba Buj | ..... | 280/124.159 |
| 7,686,309 B2* | 3/2010 | Munday et al. | ............ | 280/5.507 |
| 2004/0169345 A1* | 9/2004 | Fontdecaba Buj | ....... | 280/124.16 |

FOREIGN PATENT DOCUMENTS

| | | |
|---|---|---|
| EP | 1 705 094 A1 | 9/2006 |
| JP | 63 263123 | 10/1988 |

(Continued)

*Primary Examiner* — Paul N Dickson
*Assistant Examiner* — Nicole Verley
(74) *Attorney, Agent, or Firm* — Oblon, Spivak, McClelland, Maier & Neustadt, L.L.P.

(57) ABSTRACT

In a system including four electromagnetic absorbers for respective four vehicle wheels, motor coils of two respective electromagnetic absorbers disposed corresponding to two diagonally located wheels are connected forming a closed loop including the coils. A generated damping force magnitude can be made different between an instance directions of respective movements of the diagonally located two wheels with respect to the vehicle body are the same, and an instance the directions are opposite each other. Each electromagnetic absorber includes a resistor cooperating with the corresponding coil forming a closed loop, and selectively establishes: a connected state in which one of the four coils and any of the other three coils are connected to form a closed loop; and a non-connected state in which the one of the four coils is not connected to any other coil. An appropriate vibration suppressing action is exhibited with respect to a coupled motion.

8 Claims, 13 Drawing Sheets

FOREIGN PATENT DOCUMENTS

| | | |
|---|---|---|
| JP | 4-129815 | 4/1992 |
| JP | 2001 310736 | 11/2001 |
| JP | 2003 505297 | 2/2003 |
| JP | 2003 223220 | 8/2003 |
| JP | 2003-227543 | 8/2003 |
| JP | 2005 162021 | 6/2005 |
| JP | 2005 233347 | 9/2005 |
| WO | WO 2005/056361 A1 | 6/2005 |

* cited by examiner

FIG.4

|  | EXTERNAL FORCE APPLICATION IN SAME PHASE | EXTERNAL FORCE APPLICATION IN OPPOSITE PHASES |
|---|---|---|
| CURRENT | LESS LIKELY TO FLOW | LIKELY TO FLOW |
| DAMPING FORCE | SMALL | LARGE |

FIG.11

| VIBRATION MODE | VIBRATION COMPONENT | CONNECTION ARRANGEMENT |
|---|---|---|
| PITCH | $(X_{FL}+X_{FR})/2-(X_{RL}+X_{RR})/2$ | FL AND RL, FR AND RR |
| ROLL | $(X_{FL}+X_{RL})/2-(X_{FR}+X_{RR})/2$ | FL AND FR, RL AND RR |
| FIRST DIAGONAL DIFFERENCE AMOUNT | $X_{FL}-X_{RR}$ | FL AND RR |
| SECOND DIAGONAL DIFFERENCE AMOUNT | $X_{FR}-X_{RL}$ | FR AND RL |

# SUSPENSION SYSTEM FOR VEHICLE

TECHNICAL FIELD

The present invention relates to a suspension system for a vehicle and more particularly to such a suspension system equipped with electromagnetic absorbers.

BACKGROUND ART

A suspension apparatus for an automotive vehicle not only supports a weight of the vehicle (a sprung weight), but also mitigates vibrations due to roughness of a road surface for improving ride comfort of the vehicle and reduces dynamic load that is applied to various portions of a body of the vehicle for improving running stability of the vehicle. One of elements that constitute the suspension apparatus is a shock absorber, and there has been developed, as the shock absorber, an electromagnetic absorber operable to generate, based on a force of a motor, a damping force with respect to a relative movement of a sprung portion and an unsprung portion of the vehicle.

The above-described electromagnetic absorber is operable to generate the damping force by shortcircuiting a coil of the motor, in other words, by electrically connecting terminals of the motor outside the motor. For instance, Japanese Patent Application Publication JP-A-2003-223220 describes an electromagnetic suspension apparatus in which a damping force is generated by shortcircuiting the coil of the motor when the electromagnetic suspension apparatus is out of control. Japanese Patent Application Publication JP-A-2001-310736 discloses a technique of controlling the damping force in relation to a control for an electromagnetic suspension apparatus. More specifically, in the disclosed technique, two of four coils of respective four electromagnetic absorbers are connected, and directions of respective current flows in the respective two coils are changed depending upon changes in the posture of the vehicle, thereby controlling directions of respective electromagnetic forces to be generated. Thus, the damping force is controlled.

DISCLOSURE OF THE INVENTION

(A) Summary of the Invention

In the electromagnetic suspension apparatus disclosed in the above-indicated Publication JP-A-2003-223220, however, the coil of only one electromagnetic absorber is solely shortcircuited. Therefore, the disclosed apparatus lacks in consideration of a coupled motion of the vehicle. (Here, the coupled motion of the vehicle means a motion, such as bounce, roll, pitch, or heave, in which motions of the vehicle body at at least two wheel positions, interrelate or influence with each other. In this respect, the coupled motion may be referred to as "interrelated motion".) Accordingly, the disclosed suspension apparatus fails to offer a vibration suppressing or restraining effect that is provided by a cooperative action of two electromagnetic absorbers respectively provided for left and right wheels of the vehicle, for instance. On the other hand, in the electromagnetic suspension apparatus disclosed in the above-indicated Publication JP-A-2001-310736, while it is possible to deal with the coupled motion in which a left-side motion and a right-side motion are coupled, by connecting the two coils provided for the left and right wheels, it is not possible to deal with a vibration with the coupled motion in which a front-side motion and a rear-side motion are coupled.

The above-described problems are just a part of problems experienced in the system having the electromagnetic suspension apparatus, namely, the electromagnetic suspension system. Since the electromagnetic suspension system is still under development, the system suffers from various other problems including those described above. Accordingly, it is possible to improve the utility of the system by coping with any of the problems. In other words, there is much room for improvement in the electromagnetic suspension system. The present invention has been developed in the light of the situations. It is therefore an object of the invention to provide a suspension system for a vehicle having high utility.

A suspension system for a vehicle to which the present invention is applied comprises four electromagnetic absorbers provided for respective four wheels of the vehicle, more specifically, four shock absorbers each of which includes a coil and a magnet and is operable to generate a damping force that depends on an electromotive force generated by a relative movement of the coil and the magnet. The vehicle suspension system according to a first aspect of the invention is characterized by comprising a device which connects two coils of two of the four electromagnetic absorbers that correspond to a wheel pair consisting of diagonally located two of the four wheels, more specifically, a coil connecting device which connects those two coils so as to form a closed loop including the two coils.

In the vehicle suspension system according to the above-indicated first aspect of the invention, the two coils provided so as to correspond to the diagonally located two wheels are connected to each other. Accordingly, the damping force to be generated can be made different between an instance where directions of movements of the respective two wheels relative to the vehicle body are the same as each other and an instance where those directions are opposite to each other. Accordingly, in the light of the above, the suspension system is capable of exhibiting an appropriate vibration suppressing action with respect to the coupled motion, in particular, with respect to a vibration with the coupled motion, i.e., coupled vibration.

The vehicle suspension system according to a second aspect of the invention is characterized in that each electromagnetic absorber includes a resistor that cooperates with the coil to form a closed loop and the suspension system includes a coil connecting device which selectively establishes one of (a) a connected state in which one of the coils is connected to any one of the other three coils so as to form a closed loop and (b) a non-connected state in which the one of the coils is not connected to any of the other three coils.

In the vehicle suspension system according to the above-indicated second aspect of the invention, it is possible to selectively establish a state in which one electromagnetic absorber alone can generate the damping force and a state in which an appropriate vibration suppressing action can be exhibited with respect to the vibration with the coupled motion, by connecting the coil of the above-indicated one electromagnetic absorber and the coil of any one of the other three electromagnetic absorbers.

(B) Forms Of Invention

There will be described various forms of an invention which is considered claimable (hereinafter referred to as "claimable invention" where appropriate). Each of the forms of the claimable invention is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following descriptions of the various forms and preferred embodiments. It is to be further understood that any form in which one or more elements is/are added to or deleted from any one of the following forms may be considered as one form of the claimable invention.

(1) A suspension system for a vehicle comprising four electromagnetic absorbers which respectively correspond to four wheels of the vehicle and each of which includes: (A) a sprung-side member coupled to a sprung portion; (B) an unsprung-side member coupled to an unsprung portion and operable to move relative to the sprung-side member in association with a relative movement of the sprung portion and the unsprung portion; and (C) a damping-force generating device including a coil and a magnet that move relative to each other in association with a relative movement of the sprung-side member and the unsprung-side member and operable to generate a damping force with respect to the relative movement of the sprung-side member and the unsprung-side member depending on an electromotive force generated by a relative movement of the coil and magnet, characterized by further comprising:

a coil connecting device which connects two coils of the damping-force generating devices of two of the four electromagnetic absorbers that correspond to a wheel pair consisting of diagonally located two of the four wheels, such that a closed loop including the two coils is formed.

In the above form (1), the two coils provided so as to correspond to the diagonally located two wheels are connected to each other, so that the damping force to be generated can be made different between an instance in which a direction of the movement of one of the two wheels relative to the vehicle body is the same as a direction of the movement of the other of the two wheels relative to the vehicle body and an instance in which those directions are opposite to each other. More specifically explained, the damping force to be generated can be made different between an instance in which one of the two wheels and the vehicle body move relative to each other in a bound direction (a rebound direction) while the other of the two wheels and the vehicle body move relative to each other in the bound direction (the rebound direction) and an instance in which one of the two wheels and the vehicle body move relative to each other in the bound direction (the rebound direction) while the other of the two wheels and the vehicle body move relative to each other in the rebound direction (the bound direction). Accordingly, in the light of the above, the system according to the form (1) is capable of exhibiting an appropriate vibration suppressing effect with respect to the coupled vibration with the coupled motion, i.e., the interrelated vibration.

In the above form (1), the damping-force generating device may be constituted principally by the motor (which is a concept to be interpreted as including a "generator"), for example. In this instance, the motor may be of a rotary type or of a linear type. To connect the two coils to each other means that terminals of the respective two coils are connected to each other, for instance.

(2) The suspension system according to the form 1, wherein the coil connecting device is configured to connect the two coils constituting the closed loop so as to cause current flows in mutually different directions in the closed loop, depending on the electromotive forces generated in the respective damping-force generating devices of the two electromagnetic absorbers, when a direction of the relative movement of the sprung portion and the unsprung portion on which is disposed one of the two electromagnetic absorbers that respectively correspond to the two coils is the same as a direction of the relative movement of the sprung portion and the unsprung portion on which is disposed the other of the two electromagnetic absorbers.

In the above form (2), an orientation of connection of the two coils of the respective two electromagnetic absorbers is limited. According to the form (2), a relatively small damping force can be generated upon a bounce motion of the vehicle body while a relatively large damping force can be generated upon a roll motion, a pitch motion, etc., of the vehicle body.

(3) The suspension system according to the form (1) or (2), wherein the coil connecting device includes a first connection path that connects one ends of the respective two coils constituting the closed loop and a second connection path that connects the other ends of the respective two coils.

In the above form (3), the structure of the coil connecting device, more specifically, the structure of connection of the two coils of the respective two electromagnetic absorbers, is limited. According to the form (3), the coil connecting device has a simplified structure.

(4) The suspension system according to the form (3), wherein the coil connecting device further includes a resistor disposed to join the first connection path and the second connection path to each other.

In the above form (4), a resistor is disposed at a central portion of the closed loop so as to be in parallel with the two coils. By adjusting a resistance value of the resistor, the magnitude of the damping force to be generated by each of the two electromagnetic absorbers can be adjusted. Where the resistor is a variable resistor, it is possible to flexibly change the magnitude of the damping force of each of the two electromagnetic absorbers according to the state of the vibration being actually generated in the vehicle.

(5) The suspension system according to the form (1) or (2), wherein the coil connecting device is configured to connect the coils of the damping-force generating devices of the respective four electromagnetic absorbers so as to form two closed loops which respectively correspond to two wheel pairs each consisting of diagonally located two of the four wheels and each of which includes two coils each as the coil.

The vehicle has two wheel pairs. In the above form (5), the two coils of each of two pairs of the electromagnetic absorbers that correspond to the two wheel pairs are connected to each other. According to the form (5), the suspension system is capable of generating a more appropriate damping force with respect to the coupled motion.

(6) The suspension system according to the form (5), wherein the coil connecting device includes: two first connection paths which connect one ends of the respective two coils in each of the respective two closed loops; and two second connection paths which connect the other ends of the respective two coils in each of the respective two closed loops.

In the form (6), the structure of the coil connecting device is limited in an instance where the four electromagnetic absorbers are connected. Like the above form, the form (6) ensures a simplified structure of the coil connecting device.

(7) The suspension system according to the form (6), wherein the two first connection paths are joined to each other and the two second connection paths are joined to each other.

In the above form (7), each of the four coils of the respective four electromagnetic absorbers is connected to each of the coils of the other electromagnetic absorbers so as to form the respective closed loops. In other words, the four coils of the respective four electromagnetic absorbers are connected such that any two of the four coils can constitute the closed loop. According to the form (7), the suspension system is capable of generating a more appropriate damping force.

(8) The suspension system according to the form (7), wherein the connecting device further includes a resistor disposed to join at least one of the two first connection paths and at least one of the two second connection paths to each other.

In the above form (8), the above-described resistor is disposed in the above-described form wherein the four electromagnetic absorbers are connected. By adjusting the resistance value of the resistor, the magnitude of the damping force to be generated by each of the four electromagnetic absorbers can be adjusted. Where the resistor is a variable resistor, it is possible to flexibly change the magnitude of the damping force of each of the four electromagnetic absorbers according to the state of the vibration being actually generated in the vehicle.

(11) A suspension system for a vehicle comprising four electromagnetic absorbers which respectively correspond to four wheels of the vehicle and each of which includes: (A) a sprung-side member coupled to a sprung portion; (B) an unsprung-side member coupled to an unsprung portion and operable to move relative to the sprung-side member in association with a relative movement of the sprung portion and the unsprung portion; and (C) a damping-force generating device including a coil and a magnet that move relative to each other in association with a relative movement of the sprung-side member and the unsprung-side member and operable to generate a damping force with respect to the relative movement of the sprung-side member and the unsprung-side member depending on an electromotive force generated by a relative movement of the coil and magnet,
characterized in that
the four electromagnetic absorbers include respective four damping-force generating devices each as the damping-force generating device, each of the four damping-force generating device including a resistor that cooperates with the coil of said each of the four damping-force generating devices to form a closed loop, and
the suspension system further comprises a coil connecting device which selectively establishes owing to an operation thereof, for each of the four damping-force generating devices, one of (a) a connected state in which two coils consisting of the coil of one of the four damping-force generating devices and the coil of any one of the other three damping-force generating devices except the one of the four damping-force generating devices are connected to each other so as to form a closed loop including the two coils and (b) a non-connected state in which the coil of the one of the four damping-force generating devices is not connected to any of the coils of the other three damping-force generating devices.

In the above form (11), it is possible to selectively establish a state in which one electromagnetic absorber alone can generate the damping force and a state in which an appropriate vibration suppressing action can be exhibited with respect to the vibration with the coupled motion, by connecting the coil of the above-indicated one electromagnetic absorber and the coil of any one of the other three electromagnetic absorbers.

(12) The suspension system according to the form (9), wherein the coil connecting device is configured to connect the two coils constituting the closed loop so as to cause current flows in mutually different directions in the closed loop, depending on the electromotive forces generated in the respective damping-force generating devices of corresponding two of the four electromagnetic absorbers, when a direction of the relative movement of the sprung portion and the unsprung portion on which is disposed one of the two electromagnetic absorbers that respectively correspond to the two coils is the same as a direction of the relative movement of the sprung portion and the unsprung portion on which is disposed the other of the two electromagnetic absorbers.

In the above form (12), the orientation of connection of the two coils of the respective two electromagnetic absorbers is limited. According to the form (12), it is possible to generate a larger damping force upon the roll motion, the pitch motion, etc., of the vehicle body than upon the bounce motion of the vehicle body.

(13) The suspension system according to the form (9) or (10), further comprising a control device which controls the suspension system,
wherein the control device includes a coil-connecting-device control portion which controls the operation of the coil connecting device such that the coil of at least one of the four damping-force generating devices and the coil of any one of the other damping-force generating devices are connected to each other, when a vibration that should be suppressed is being generated in the vehicle.

In the above form (13), the connected state and the non-connected state indicated above can be selectively established automatically depending upon the necessity of vibration suppression.

(14) The suspension system according to the form (11),
wherein the control device further includes a vibration-mode judging portion which judges a mode of the vibration that is being generated in the vehicle, and
wherein the coil-connecting-device control portion is configured to change the coil of one of the other three damping-force generating devices that is to be connected to the coil of one of the four damping-force generating devices, based on a judgment made by the vibration-mode judging portion.

According to the above form (14), the combination of connection of the coils of the respective electromagnetic absorbers can be changed depending upon the mode of the vibration, thereby ensuring the damping characteristics suitable for the mode of the vibration. More specifically, it is possible to effectively damp the vibration in the outstanding mode.

(15) The suspension system according to the form (12), wherein the vibration-mode judging portion is configured to judge, as the mode of the vibration, at least one of a roll-vibration mode in which is being generated a roll vibration that should be suppressed and a pitch-vibration mode in which is being generated a pitch vibration that should be suppressed.

According to the above form (15), it is possible to appropriately cope with at least one of the roll vibration and the pitch vibration each as the basic coupled vibration.

(16) The suspension system according to the form (13),
wherein the vibration-mode judging portion is configured to judge, as the mode of the vibration, at least the roll-vibration mode in which is being generated the roll vibration that should be suppressed, and
wherein the coil-connecting-device control portion is configured, when the mode of the vibration is the roll-vibration mode, to establish a connected state in which are connected two coils of the damping-force generating devices of two of the four electromagnetic absorbers respectively provided for left and right wheels, so as to form the closed loop including the two coils, on at least one of a front-wheel side and a rear-wheel side.

(17) The suspension system according to the form (13) or (14),
wherein the vibration-mode judging portion is configured to judge, as the mode of the vibration, at least the pitch-vibration mode in which is being generated the pitch vibration that should be suppressed, and wherein the coil-connecting-device control portion is configured, when the mode of the vibration is the pitch-vibration mode, to establish a connected state in which are connected two coils of the damping-force generating devices of two of the four electromagnetic absorbers respectively provided for front and rear wheels, so as to form the closed loop including the two coils, on at least one of a left-wheel side and a right-wheel side.

In the above two forms (16) and (17), the manner of connection of the electromagnetic absorbers is limited to cope with the roll vibration and the pitch vibration, respectively. According to the above forms (16) and (17), it is possible to appropriately cope with the roll vibration and the pitch vibration, respectively.

(18) The suspension system according to any one of the forms (12)-(15), further comprising a motion-state-index-amount detecting device which detects a motion-state index amount indicative of a state of a motion of the vehicle or a part of the vehicle, wherein the vibration-mode judging portion is configured to judge the mode of the vibration based on the motion-state index amount detected by the motion-state-index-amount detecting device.

In the above form (18), the manner of judging the mode of the vibration is limited. The "motion-state index amount" in the form (18) includes a variety of parameters relating to the behavior of the vehicle, the vehicle body, the wheels, etc. In the form (18), the mode of the vibration, more specifically, the kind of the vibration, is judged by employing at least one of the parameters. The motion-state index amount is not particularly limited, but at least one of the following may be employed. For instance, the motion-state index amount may include a running speed of the vehicle, a steering angle, a yaw rate, longitudinal acceleration of the vehicle, lateral acceleration of the vehicle, roll moment, and pitch moment. Further, the motion-state index amount may include vertical acceleration, a speed (velocity) of the vertical movement, and an amount of the vertical movement, of each of the sprung portion and the unsprung portion at each wheel position. Moreover, the motion-state index amount may include relative acceleration in the vertical direction, a relative speed (velocity), of the sprung portion and the unsprung portion, a distance therebetween, and a stroke amount of the sprung portion and the unsprung portion, at each wheel position.

(19) The suspension system according to the form (16), wherein the motion-state-index-amount detecting device includes stroke-amount detectors provided for the respective four wheels to detect, as the motion-state index amount, a stroke amount of the sprung portion and the unsprung portion for each of the four wheels, and wherein the vibration-mode judging portion is configured to judge the mode of the vibration based on the stroke amount detected for said each of the four wheels by the corresponding stroke-amount detector.

(20) The suspension system according to the form (16) or (17), wherein the motion-state-index-amount detecting device includes acceleration detectors provided for the respective four wheels to detect, as the motion-state index amount, at least one of vertical acceleration of the sprung portion and vertical acceleration of the unsprung portion for each of the four wheels, and wherein the vibration-mode judging portion is configured to judge the mode of the vibration based on the at least one of the vertical acceleration of the sprung portion and the vertical acceleration of the unsprung portion detected for said each of the four wheels by the corresponding acceleration detector.

In the above forms (19) and (20), the above-described motion-state index amount is specifically limited. According to those forms, the mode of the vibration can be easily judged.

(31) A suspension system for a vehicle comprising four electromagnetic absorbers which respectively correspond to four wheels of the vehicle and each of which includes: (A) a sprung-side member coupled to a sprung portion; (B) an unsprung-side member coupled to an unsprung portion and operable to move relative to the sprung-side member in association with a relative movement of the sprung portion and the unsprung portion; and (C) a damping-force generating device including a coil and a magnet that move relative to each other in association with a relative movement of the sprung-side member and the unsprung-side member and operable to generate a damping force with respect to the relative movement of the sprung-side member and the unsprung-side member depending on an electromotive force generated by a relative movement of the coil and magnet, characterized in that the four electromagnetic absorbers include respective four damping-force generating devices each as the damping-force generating device, each of the four damping-force generating devices being configured to be operable to execute a power-reception operation in which at least one of the damping force or an impulsive force is generated with respect to the relative movement of the sprung-side member and the unsprung-side member with electric power supplied to said each of the four damping force generating devices, the suspension system further comprises: (a) a power source; (b) four drive circuits which are provided respectively for the four damping-force generating devices and through which the electric power from the power source is supplied to the respective four damping-force generating devices for permitting the respective four damping-force generating devices to execute the power-reception operations; (c) four connection selectors which are provided respectively for the four damping-force generating devices and which are for respectively connecting, owing to operations thereof, the four damping-force generating devices to the four drive circuits that respectively correspond to the four damping-force generating devices; and (d) a control device which controls the suspension system, the control device includes: connection-selector control portion which controls the operation of each of the four connection selectors; a power-reception-operation control portion which controls, by controlling at least one of the four drive circuits, the power-reception operation of at least one of the four damping-force generating devices that corresponds to the at least one of the four drive circuits; and a control switching portion which selectively determines one of execution and non-execution of the power-reception operation of the damping-force generating device of each of the four electromagnetic absorbers, by giving commands to the connection-selector control portion and the power-reception-operation control portion.

The above form (31) relates to a suspension system in which the control of each of the four electromagnetic absorbers is selectively changeable between: a control (so-called "passive control") in which the damping force is generated mainly by utilizing the electromotive force generated in the damping-force generating device of each electromagnetic absorber; and a control (so-called "active control") that allows the above-indicated power-reception operation in which the damping force or the impulsive force is generated by supplying the electric power from the power source to the damping-force generating device of each electromagnetic absorber. The power-reception operation executed in the active control permits a larger magnitude of the damping force to be generated than in the passive control. In the form (31), therefore, the damping force can be properly controlled depending upon the state of the vehicle such as the mode of the vibration of the vehicle body, by switching the control of each electromagnetic absorber between the passive control and the active control. Since the impulsive force can be also generated in the power-reception operation, the damping force can be controlled based on a skyhook damper theory according to the active control. Where the suspension system is configured to execute the passive control under a situation in which a relatively large magnitude of the damping force is not required, it is possible to reduce electric power consumption in the present suspension system.

It is noted that the control by the above-indicated power-reception-operation control portion is not limited to a control wherein the damping-force generating device is constantly kept under the power-reception operation. That is, the power-reception operation may be executed even temporarily. For instance, when only a relatively small magnitude of the damping force is required even though the damping-force generating device is connected to the corresponding drive circuit, the damping-force generating device may be controlled by the power-reception-operation control portion so as to generate the damping force with no electric power supplied thereto from the power source.

(32) The suspension system according to the form (31), further comprising a motion-state-index-amount detecting device which detects a motion-state index amount indicative of a state of a motion of the vehicle or a part of the vehicle, wherein the control device further includes a vibration-state judging portion which judges a state of a vibration that is being generated in the vehicle, based on a judgment made by the motion-state-index-amount detecting device, and wherein the control switching portion is configured to permit at least one of the four damping-force generating devices to execute the power-reception operation, when the vibration-state judging portion judges that high response is required to deal with the vibration that is being generated in the vehicle.

As explained above, the power-reception operation permits a relatively large magnitude of the damping force to be generated. The above form (32) takes this into account. For instance, under a situation in which the response to the vibration is insufficient due to shortage of the damping force in the passive control, the control of each electromagnetic absorber can be switched from the passive control to the active control, thereby improving the response to the vibration. On the other hand, under a situation in which a relatively large magnitude of the damping force is not required, the passive control is kept executed, thereby reducing the electric power consumption in the suspension system.

(33) The suspension system according to the form (31) or (32), wherein the control switching portion is configured to prohibit the power-reception operations of all of the four damping-force generating devices when a voltage of the power source becomes equal to or lower than a prescribed threshold voltage.

According to the form (33), even when the voltage of the power source is somewhat lowered due to a decrease in the electric energy charged in the power source such as a battery, it is possible to effectively reduce or avoid an adverse influence due to a further decrease in the voltage resulting from a continued execution of the active control, e.g., an adverse influence that is given to the other system.

(34) The suspension system according to any one of the forms (31)-(33), further comprising a control selecting switch which is to be manipulated by a vehicle operator to select one of the execution and the non-execution of the power-reception operations of all of the four damping-force generating devices, wherein the control switching portion is configured to selectively determine one of the execution and the non-execution of the power-reception operations of the respective four damping-force generating devices, based on a command of the control selecting switch.

The above form (34) permits the control of the electromagnetic absorbers to be changed depending upon a preference or intension of a vehicle operator.

(35) The suspension system according to any one of the forms (31)-(34), wherein the control device further includes an abnormality monitoring portion which monitors an occurrence of an abnormality in the suspension system, and wherein the control switching portion is configured to forcibly prohibit the power-reception operations of the respective four damping-force generating devices when there occurs an abnormality that the execution of the power-reception operations of the respective four damping-force generating devices is impossible.

According to the above form (35), the passive control can be utilized as a backup of the active control, thus realizing the system which is excellent in terms of failsafe. This form may be configured such that the active control backs up the passive control where there occurs an abnormality in which the passive control is inoperable.

(36) The suspension system according to any one of the forms (31)-(35), further comprising a coil connecting device operable to connect the coil of any one of the four damping-force generating devices and the coil of any one of the other three damping-force generating devices so as to form a closed loop including the two coils, wherein the four connection selectors constitute a part of the coil connecting device.

In short, the suspension system according to the above form (36) is equivalent to the suspension system operable to execute the active control in which is disposed the coil connecting device explained above. The form (36) enjoys various merits explained above with respect to the coil connecting device.

BRIEF DESCRIPTION OF THE DRAWINGS

FIG. 4 is a table indicating characteristics exhibited by each of the electromagnetic absorbers when coils of the respective electromagnetic absorbers are connected.

FIG. 11 is a table indicating component amounts of vibrations in respective vibration modes and connection arrangements of the coils of the respective electromagnetic absorbers to cope with the respective vibration modes.

BEST MODE FOR CARRYING OUT THE INVENTION

There will be described in detail some embodiments of the claimable invention with reference to the drawings. It is to be understood, however, that the claimable invention is not limited to the following embodiments but may be embodied with various changes and modifications, such as those described in the FORMS OF THE INVENTION, which may occur to those skilled in the art.

First Embodiment

Figure 1:
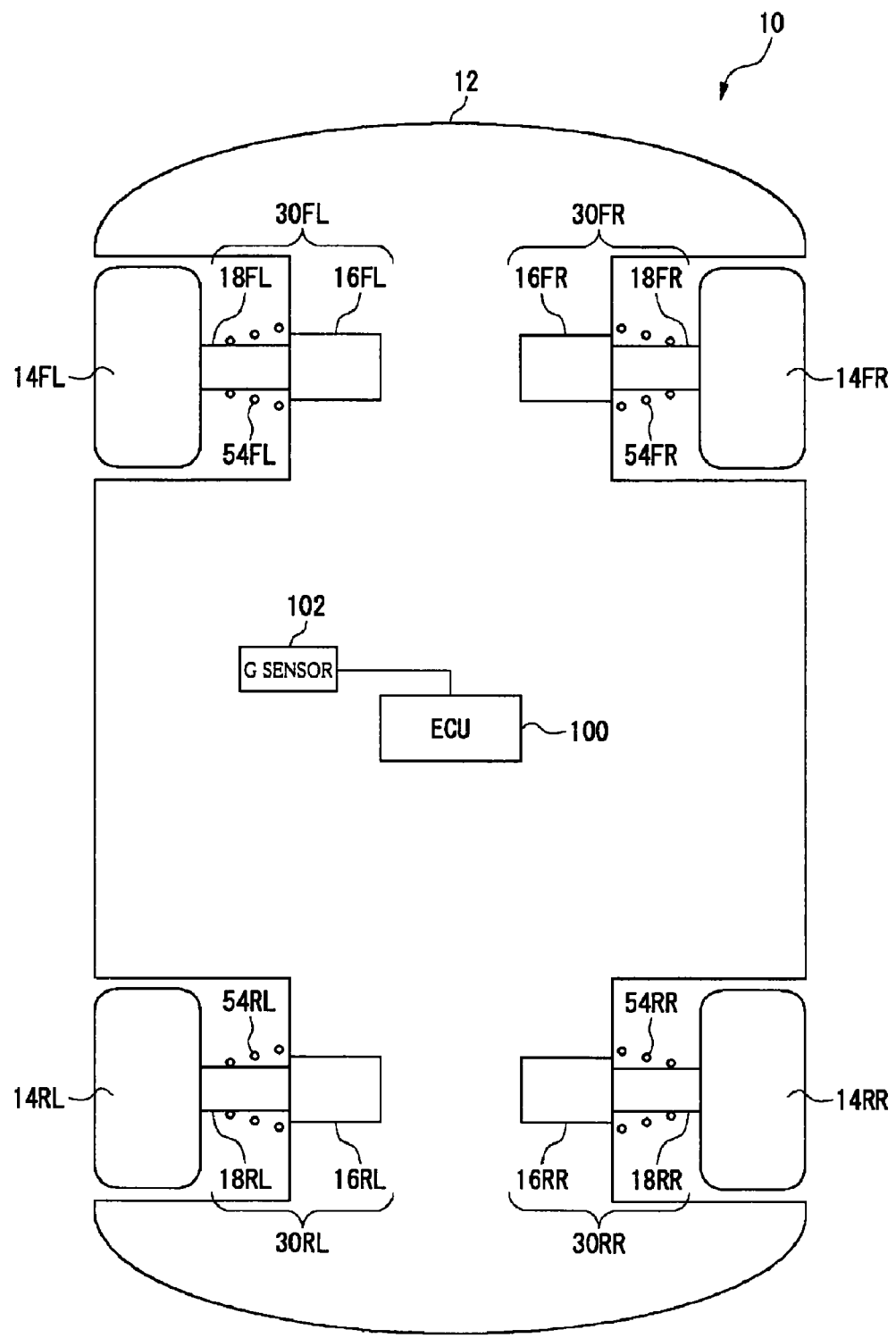
FIG. 1 is a schematic view showing a vehicle equipped with a suspension system according to a first embodiment of the claimable invention.

FIG. 1 is a schematic view of a vehicle 10 equipped with a suspension system according to a first embodiment. Between a body 12 of the vehicle 10 and the wheels 14FR, 14FL, 14RR, 14RL, there are respectively disposed coil springs 54FR, 54FL, 54RR, 54RL each as a suspension spring and electromagnetic absorbers 30FR, 30FL, 30RR, 30RL. In the respective electromagnetic absorbers 30FR, 30FL, 30RR, 30RL, motors 16FR, 16FL, 16RR, 16RL each functioning as a generator and cylinder devices 18FR, 18FL, 18RR, 18RL each functioning as a telescopic member are disposed in series. In the following description, the wheels, the coil springs, the motors, the cylinder devices, and the electromagnetic absorbers may be collectively referred to as "wheel(s) 14", "coil spring(s) 54", "motor(s) 16", "cylinder device(s) 18", and "electromagnetic absorber(s) 30", respectively, where appropriate. It is noted that the reference numerals "FR", "FL", "RR", and "RL" respectively indicate a front right position, a front left position, a rear right position, and a rear left position, in the vehicle 10.

While the present vehicle suspension system is constituted by including the four coil springs 54 and the four electromagnetic absorbers 30, the electromagnetic absorbers 30 are two-dimensionally illustrated in FIG. 1 schematically showing the system. In an actual vehicle, each electromagnetic absorber 30 is disposed in a suitable posture for exhibiting a function as a shock absorber in the suspension system. For instance, each electromagnetic absorber 30 is disposed in combination with other components such as an axle carrier, a tie rod, an upper arm, a lower arm, etc., in a manner known in the art.

The coil spring 54 prevents a vibration form a road surface from transmitting directly to the vehicle body 12 from the wheel 14. The electromagnetic absorber 30 generates a damping force with respect to a relative movement of a sprung portion and an unsprung portion of the vehicle, based on a force generated by the motor 16. In the present specification, a portion of the vehicle supported by the coil spring 54 is referred to as the "sprung portion" while a portion of the vehicle not supported by the coil spring 54 is referred to as the "unsprung portion". In short, the sprung portion corresponds to a body-side portion of the vehicle and the unsprung portion corresponds to a wheel-side portion of the vehicle.

From a standpoint of space saving, it is preferable that the coil spring 54 and the electromagnetic absorber 30 be constructed integrally with each other. However, the coil spring 54 and the electromagnetic absorber 30 may be provided independently of each other. A detailed structure of the electromagnetic absorber 30 will be given with reference to FIG. 2.

There are disposed, on the vehicle body 12, three acceleration sensors for respectively detecting vertical acceleration, longitudinal acceleration, and lateral acceleration, of the vehicle body 12. These three sensors are collectively indicated as a G sensor 102 in FIG. 1. The acceleration values in the respective directions of the vehicle detected by the G sensor 102 are sent to an electronic control unit 100 (hereinafter referred to as "ECU 100"). The ECU 100 functions as a control device which controls the present suspension system. More specifically, the ECU 100 controls the behavior of the vehicle 10 based on information obtained by various sensors including the G sensor 102 which are disposed in various portions of the vehicle 10.

Figure 2:
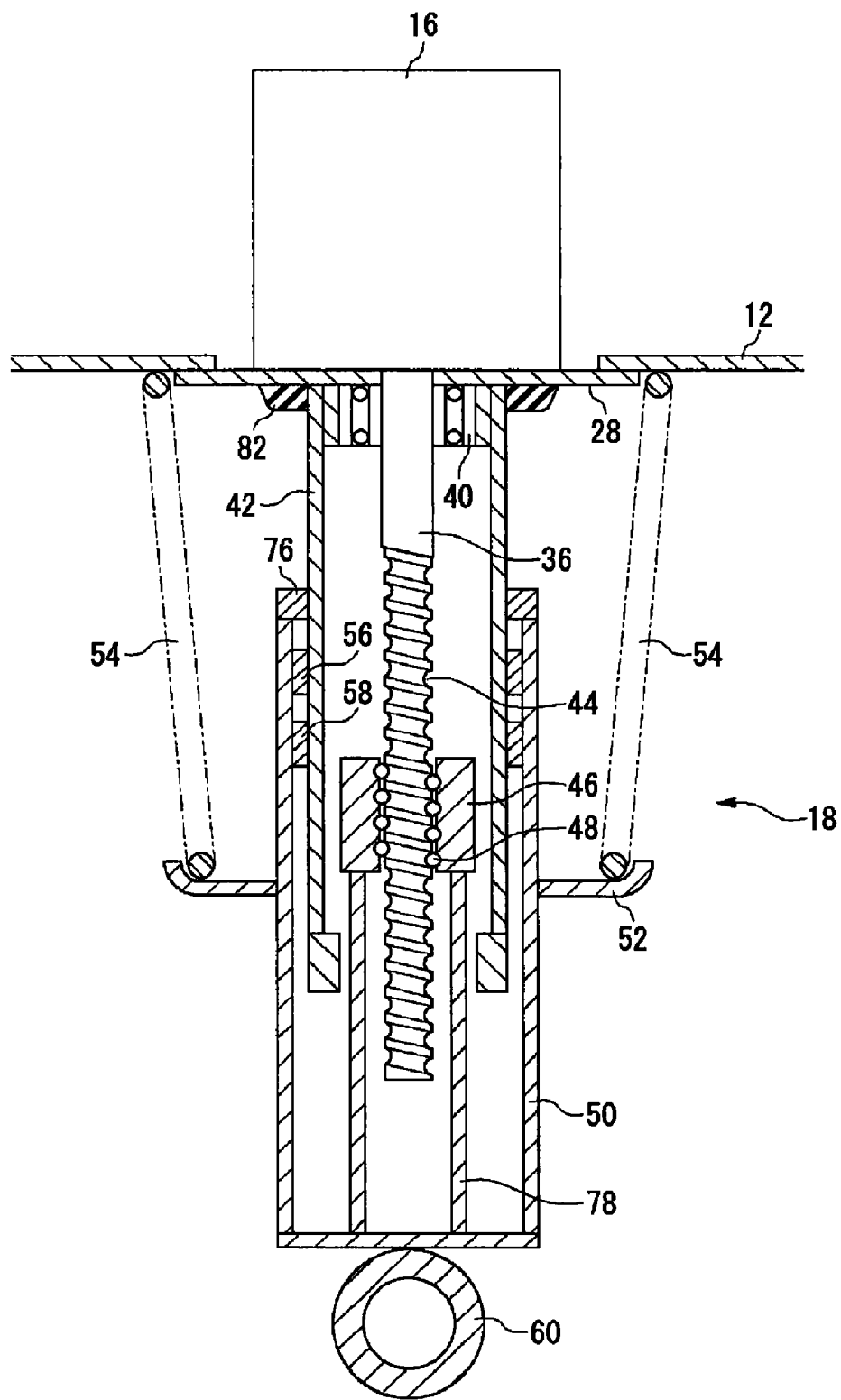
FIG. 2 is a view showing in more detail a structure of an electromagnetic absorber of the vehicle suspension system of the first embodiment.

FIG. 2 shows in more detail the structure of the electromagnetic absorber 30 constituted by the motor 16 and the cylinder device 18.

The motor 16 is a rotary DC motor, for instance, and is constituted by principally including: a stator formed by an iron core and a coil wound around the iron core; and a rotor having a cylindrical surface on which a magnet is attached and which is rotatably opposed to the stator. An output shaft 36 coupled to the rotor of the motor 16 is integral with a threaded rod 44 on which are formed thread grooves. The output shaft 36 and the threaded rod 44 may be coaxially coupled via a coupling. The output shaft 36 is disposed within an inner tube 42 so as to be rotatably supported by the inner tube 42 through a bearing 40. The inner tube 42 is one constituent element of the cylinder device 18 and functions as a sprung-side member.

The inner tube 42 is inserted in an outer tube 50 which is one constituent element of the cylinder device 18 and functions as an unsprung-side member. The inner and outer tubes 42, 50 are coaxially disposed, and the threaded rod 44 is disposed coaxially with respect to the inner and outer tubes 42, 50. Inside the outer tube 50, a nut supporting member 78 is disposed so as to extend upright from a bottom portion of the outer tube 50. A nut 46 holding a plurality of bearing balls 48 and engaging the threaded rod 44 is fixedly supported by the nut supporting member 78. The threaded rod 44, the nut 46, and the bearing balls 48 cooperate with each other to constitute a ball screw mechanism. The ball screw mechanism allows a highly efficient conversion between a rotary motion of the threaded rod 44 and a relative linear motion of the threaded rod 44 and the nut 46 in the axial direction thereof.

Between an inner surface of the outer tube 50 and an outer surface of the inner tube 42, bush bearings 56, 58 are interposed, whereby the outer tube 50 and the inner tube 42 are slidably movable relative to each other in the vertical direction.

A dust seal 76 is attached to an upper end of the outer tube 50 for sealing a spacing between the outer and inner tubes 50, 42 so as to prevent entry of foreign matters such as dusts into the outer tube 50.

At a lower end of the outer tube 50, there is provided an unsprung-side connect portion 60 as a functional portion for connecting the electromagnetic absorber 30 to a lower arm, not shown, extending from the wheel 14.

At an upper end of the inner tube 42, there is provided a sprung-side connect portion 28 as a functional portion for connecting the electromagnetic absorber 30 to the sprung portion. At a connection between the sprung-side connect portion 28 and the inner tube 42, an annular stopper 82 having a cushioning function is provided for preventing a direct contact of the upper end of the outer tube 50 and the sprung-side connect portion 28. A movable range within which the outer tube 50 is movable relative to the inner tube 42 is defined by an abutting contact of the dust seal 76 onto the stopper 82.

A flange-like spring seat 52 is provided on an outer circumferential portion of the outer tube 50. Between the spring seat 52 and a portion of the vehicle body 12 in the vicinity of the sprung-side connect portion 28, the coil spring 54 is disposed in a compressed state with its opposite ends supported therebetween. Accordingly, the coil spring 54 is given a suitable preload.

The coil spring 54 supports a sprung weight of the vehicle 10 and performs a function to prevent transmission of the vibration and the shock from the road surface to the vehicle body 12, owing to elastic deformation thereof. The vertical vibration of the vehicle body 12 generated by the elastic force of the coil spring 54 is damped by the damping force generated by the electromagnetic absorber 30.

While the threaded rod 44 and the nut 46 are provided on the sprung portion and the unsprung portion, respectively, in the present embodiment, the threaded rod 44 may be provided on the unsprung portion and the nut 46 may be provided on the sprung portion. In the present embodiment, the electromagnetic absorber 30 is disposed such that the motor 16 protrudes into the vehicle body 12 and the cylinder device 18 protrudes downwardly into a lower portion of the vehicle body. The electromagnetic absorber 30 may be disposed such that the motor 16 protrudes downwardly from the vehicle body 12.

There will be next explained a function of the electromagnetic absorber 30. When the wheel 14 and the vehicle body 12 move relative to each other in the vertical direction by an external force due to roughness or unevenness of the rod surface, the outer tube 50 and the inner tube 42 move relative to each other in the vertical direction, so that the coil spring 54 extends and contracts. In association with the relative movement of the outer and inner tubes 50, 42, the threaded rod 44 and the nut 46 move relative to each other in the axis direction, whereby the threaded rod 44 rotates, and the output shaft 36 of the motor 16 rotates. Owing to the rotation of the output shaft 36, the rotor and the stator, namely, the magnet and the coil, move relative to each other, so that an electromotive force is generated in the coil. In other words, the motor 16 functions as a generator.

The electromotive force generated in the coil is proportional to an operational speed of the rotor, namely, a rotational speed of the rotor, and the rotational speed of the rotor is proportional to a speed of the relative movement of the inner and outer tubes 42, 50. Accordingly, there is generated an electromotive force which is proportional to the speed of the relative movement of the inner and outer tubes 42, 50, namely, a speed of the relative movement of the sprung portion and the unsprung portion in the vertical direction, and there is generated a resistance force against the relative movement of the sprung portion and the unsprung portion having a magnitude corresponding to the speed of the relative movement, that is, a damping force is generated. The magnitude of the damping force depends on a current that passes through the coil. Accordingly, the magnitude of the damping force becomes larger with an increase in the current. In view of this, the electromagnetic absorber 30 may be considered as having a damping-force generating device constituted mainly by the motor 16.

The motor 16 may be operated by supplying thereto electric power from an external power source. When the output shaft 36 is given a rotational force by the supplied electric power, the rotational force is given to the nut 46, and a force is given between the threaded rod 44 and the nut 46 to move the same 44, 46, relative to each other. As a result, there is generated a force to move the outer and inner tubes 50, 42 relative to each other, namely, a force to move the sprung portion and the unsprung portion relative to each other. Thus, the electromagnetic absorber 30 is configured to be operable to generate a damping force or an impulsive force with respect to the relative movement of the sprung portion and the unsprung portion, by supplying the electric power to the motor 16. Incidentally, in this operation of the electromagnetic absorber 30, that is, in a power-reception operation of the motor 16 in which the electric power is supplied to the motor 16, the damping force or the impulsive force can be adjusted by adjusting an amount of the current that is supplied to the motor 16, more strictly, an amount of the current that passes through the coil of the motor 16. By utilizing the power-reception operation, the current is controlled depending on the vertical acceleration of the vehicle body 12, i.e., the sprung portion, for instance, whereby the damping force can be controlled based on the skyhook theory.

Where the motor 16 is utilized as the generator, it is not required to give an electric energy to the electromagnetic absorber 30, resulting in a reduction in power consumption. Further, the battery can be charged by regeneration of the vibration energy. In addition, the power being generated by the electromagnetic absorber 30 can be measured by measuring the current passing through the coil. Thus, the electromagnetic absorber 30 offers various advantages and characteristics that cannot be offered by conventional hydraulic dampers (hydraulic absorbers).

Figure 3:
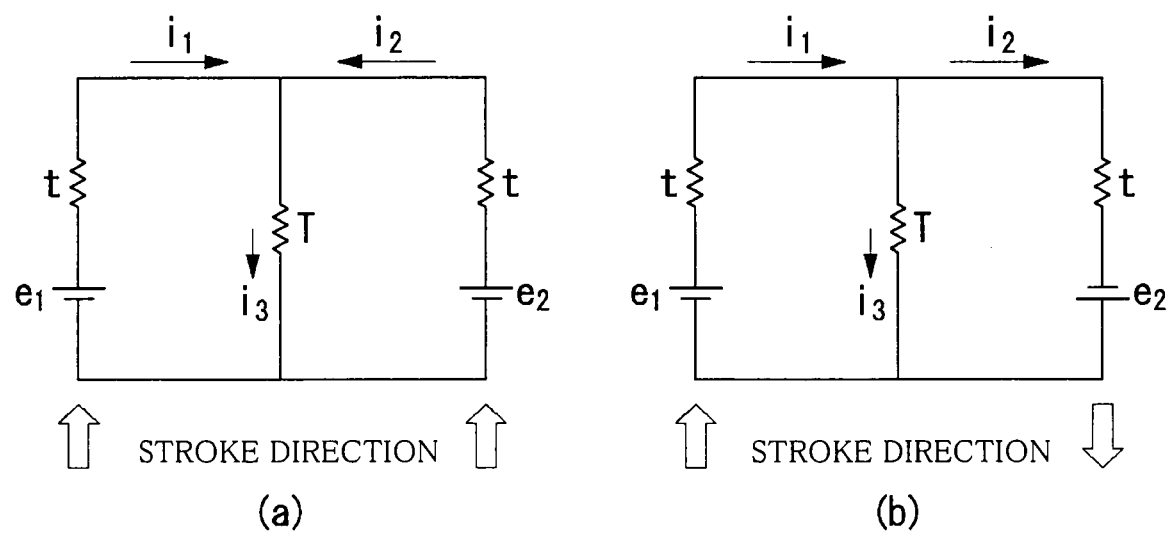
FIG. 3 is a view for explaining the principle of the suspension system of the first embodiment.

Referring next to FIG. 3, there will be explained a principle of the present embodiment. In the present embodiment, any two of the coils of the motors 16 of the respective four electromagnetic absorbers 30 disposed for the respective four wheels 14 are connected to form a closed loop. In that state, the damping force is generated.

Each of FIGS. 3(a) and 3(b) shows a state in a closed loop in which any two of the four coils of the respective four electromagnetic absorbers 30 are connected, upon application of the external forces in the vertical direction to the respective two electromagnetic absorbers 30 respectively from the corresponding two wheels. FIG. 3(a) shows an instance in which the stroke directions of the two cylinder devices 18 corresponding to the two coils, i.e., the directions of the telescopic movements of the two cylinder devices 18, have the same phase, such as upon the bounce motion, namely, an instance in which the external forces in the same direction are applied. FIG. 3(b) shows an instance in which the stroke directions of the two cylinder devices 18 have phases opposite to each other, such as upon the pitch motion and the roll motion, namely, an instance in which the external forces in the opposite directions are applied. In FIGS. 3(a) and 3(b), each of open arrows indicates a direction in which the external force is applied, ie., a direction of the movement. Each of "$e_1$" and "$e_2$" represents the electromotive force of the coil, "t", represents an internal resistance of each coil, "T" represents a resistor disposed in parallel with the two coils, and each of "$i_1$", "$i_2$", and "$i_3$" represents a current passing through the circuit.

When the stroke directions of the two cylinder devices 18 have the same phase, namely, the stroke directions are the same, as shown in FIG. 3(a), the electromotive forces $e_1$, $e_2$ have respective directions indicated in FIG. 3(a). Where T>>t, for simplification, $i_3$ is considered to be equal to zero, i.e., $i_3=0$. Therefore, the following formula is established:

$$i_1 = i_2 = (e_1 - e_2)/2t$$

As apparent from FIG. 3(a), when the stroke directions of the two cylinder devices 18 have the same phase, the directions of the electromotive forces $e_1$, $e_2$ of the respective two coils in the closed loop constituted by including the two coils are opposite to each other, and the currents $i_1$, $i_2$ are relatively small. Accordingly, the forces generated by the respective two electromagnetic absorbers 30 are relatively small. In one of the two electromagnetic absorbers 30 in which the speed of the telescopic movement of the corresponding cylinder device 18 is large, there is generated a damping force to suppress the motion. On the contrary, in the other of the two electromagnetic absorbers 30 in which the speed of the telescopic movement of the corresponding cylinder device 18 is small, there is generated a force to accelerate the motion. In consequence, the two electromagnetic absorbers 30 cooperate with each other to exert a force to average the speed of the relative movement of the vehicle body and the wheel at the wheel position where one of the two absorbers 30 is disposed and the speed of the relative movement of the wheel and the vehicle body at the wheel position where the other of the two absorbers 30 is disposed. Described more specifically, where one of the two coils belongs to the electromagnetic absorber 30 disposed for the wheel on the left side of the vehicle and the other of the two coils belongs to the electromagnetic absorber 30 disposed for the wheel on the right side of the vehicle, there is given to the vehicle body a certain magnitude of a force to suppress the roll motion of the vehicle body.

On the other hand, when the stroke directions of the two cylinder devices 18 have the phases opposite to each other, namely, the stroke directions are opposite, as shown in FIG. 3(b), the electromotive forces $e_1$, $e_2$ have respective directions indicated in FIG. 3(b). In this instance, the following formula is established similarly in the instance in which the stroke directions have the same phase:

$$i_1 = i_2 = (e_1 + e_2)/2t$$

As apparent from FIG. 3(b), when the stroke directions of the two cylinder devices 18 have the mutually opposite phases, the directions of the electromotive forces $e_1$, $e_2$ of the respective two coils in the closed loop constituted by including the two coils are the same as each other, and the currents $i_1$, $i_2$ are relatively large. Accordingly, the damping forces generated by the respective two electromagnetic absorbers 30 are relatively large. That is, each of the two electromagnetic absorbers 30 generates a relatively large damping force with respect to the relative movement of the wheel and the vehicle body at the corresponding wheel position where the electromagnetic absorber 30 is disposed. Described more specifically, where one of the two coils belongs to the electromagnetic absorber 30 disposed for the wheel on the left side of the vehicle and the other of the two coils belongs to the electromagnetic absorber 30 disposed for the wheel on the right side of the vehicle, there is given to the vehicle body a relatively large magnitude of a force to suppress the roll motion of the vehicle body.

In general, the suspension system is required to realize improvement in both of the steering stability and the ride comfort, which are mutually contradictory characteristics. In the bounce motion of the vehicle, for instance, it is required to improve the ride comfort by generating a small damping force for the purpose of preventing transmission of the vibration from the road surface to the sprung portion. On the other hand, in the roll motion and the pitch motion of the vehicle, it is required to generate a large damping force for the purpose of minimizing changes in the vehicle posture. In the presence of such mutually contradictory demands, where the suspension system is constructed such that the electromagnetic absorbers disposed for the respective four wheels work independently of each other, any one of the characteristics described above cannot be sufficiently achieved. Connecting any of the coils of the respective electromagnetic absorbers disposed for the respective wheels is an effective means of satisfying the mutually contradictory demands described above. Where the two coils of the respective two electromagnetic absorbers are connected to form the closed loop including the two coils, for instance, it is possible to realize a suspension system exhibiting rigidity in a roll or a pitch direction and non-rigidity in a bounce direction.

The table of FIG. 4 shows the characteristics of the electromagnetic absorbers 30 when any of the coils of the respective absorbers 30 are connected. The suspension system according to the present embodiment is constructed to cope with the above-described mutually contradictory demands, by utilizing the characteristics of the two electromagnetic absorbers 30 that vary depending upon whether the external forces are applied to the respective two electromagnetic absorbers in the same direction or in the opposite directions.

Where the motor 16 is utilized as the generator as described above, the resistance force is generated, and the current passes through the coil. The force generated by the motor 16 is proportional to the current amount, and the electromotive force is proportional to the rotational speed of the motor 16. Therefore, the resistance force is proportional to the rotational speed of the motor 16, namely, proportional to the speed of the relative movement of the spring portion and the unsprung portion. Accordingly, the resistance force acts as the damping force. Since the damping force is proportional to the amount of the current that passes through the coil of the stator, the amount of the current that passes through the coil is adjusted to vary the damping force. As explained above, the resistor T is disposed in the circuit in which the two coils are connected, and the damping force can be tuned as desired by changing the resistance value of the resistor T.

Figure 5:
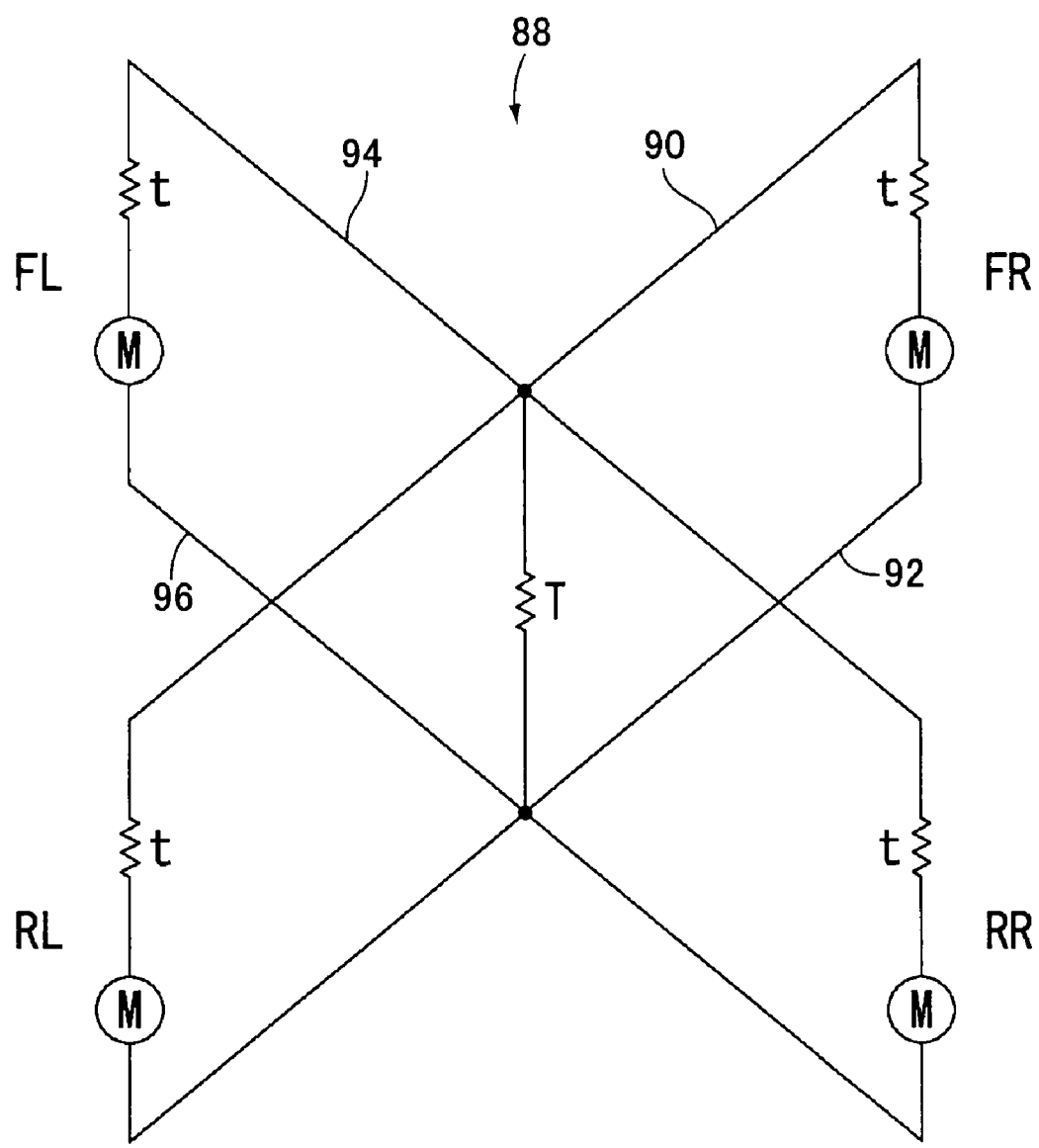
FIG. 5 is a view showing a manner of connection of the coils of the respective electromagnetic absorbers in the suspension system of the first embodiment.

FIG. 5 shows a manner or arrangement of connection of the coils in the suspension system according to the first embodiment. In FIG. 5, "FR", "FL", "RR", and "RL" respectively represent the coils at the wheels 14FR, 14FL, 14RR, and 14RL. Each of "M" represents the motor 16 and each of "t" represents an internal resistance in each coil. In the present suspension system, the coils FR and RL which are disposed so as to correspond to two diagonally located wheels of the vehicle as one wheel pair are connected to form a closed loop including the coils FR and RL, and the coils FL and RR which are disposed so as to correspond to another two diagonally located wheels as another wheel pair are connected to form another closed loop including the coils FL and RR.

More specifically explained, one closed loop is formed by: a first connection path 90 that connects one end of the coil FR and one end of the coil RL; and a second connection path 92 that connects the other end of the coil FR and the other end of the coil RL. Further, another closed loop is formed by: another first connection path 94 that connects one end of the coil FL and one end of the coil RR; and another second connection path 96 that connects the other end of the coil FL and the other end of the coil RR. The two first connection paths 90, 94 are joined to each other, and the two second connection paths 92, 96 are joined to each other. A resistor T which is common to the two closed loops is disposed so as to join the first connection paths 90, 94 and the second connection paths 92, 96 to each other. In other words, the present suspension system is equipped with a coil connecting device 88 having the above-described circuit structure including the two first connection paths 90, 94, the two second connection paths 92, 96, and the resistor T.

Owing to the coil connecting device 88 constructed as described above, the external forces are applied to the respective four electromagnetic absorbers 30 in the same direction upon the bounce motion of the vehicle. Accordingly, the damping force generated by each of the electromagnetic absorbers 30 is relatively small as explained above. On the contrary, upon occurrence of a composite motion of the pitch motion and the roll motion (i.e., coupled motion of the pitch motion and the roll motion), the external forces are applied in the mutually opposite directions respectively to the two electromagnetic absorbers 30 for each wheel pair consisting of the corresponding two diagonally located wheels. In this instance, the damping force generated by each electromagnetic absorber 30 is relatively large. In the present suspension system, the coils for each wheel pair consisting of the corresponding two diagonally located wheels are connected to form the closed loop including the coils, whereby an appropriate damping force can be generated even against the composite motion of the roll motion and the pitch motion.

In the present suspension system, there are also formed: a closed loop including the coils FL and FR of the respective two electromagnetic absorbers 30FL and 30FR on the front-wheel side; and a closed loop including the coils RL and RR of the respective two electromagnetic absorbers 30RL and 30RR on the rear-wheel side. Further, there are formed: a closed loop including the coils FL and RL of the respective two electromagnetic absorbers 30FL and 30RL on the left-wheel side; and a closed loop including the coils FR and RR of the respective two electromagnetic absorbers 30FR and 30RR on the right-wheel side. Therefore, each of the electromagnetic absorbers 30 is capable of generating a relatively large damping force with respect to not only the above-indicated composite motion but also the simple roll motion or pitch motion. Thus, the present suspension system can effectively cope with the roll motion and the pitch motion.

The present suspension system may be modified to have a coil connecting device constructed such that the closed loop including the coils FR and RL is not connected to the closed loop including the coils FL and RR, thereby forming two mutually independent closed loops. Further, the suspension system may be modified to have a coil connecting device constructed such that only one of the two closed loops is formed. In these arrangements, it is also possible to generate a relatively large damping force with respect to the roll motion and the pitch motion. Moreover, the system may be modified to have a coil connecting device in which the resistor T is not provided. Even if the resistor T is not provided, a certain degree of effect can be obtained.

In the present suspension system, the resistor T may be a variable resistor. Where the variable resistor is employed, it is possible to change, depending on the circumstances, the magnitude of the damping force to be generated by each electromagnetic absorber 30, the damping characteristic of the system as a whole, etc., based on the state of the vibration that is being generated in the vehicle, the state of the vibration that is expected to be generated, etc. The variable resistor can be controlled by the ECU 100 indicated above, for example. In this instance, the control of the ECU 100 may be executed based on the vertical acceleration, the longitudinal acceleration, the lateral acceleration and the like, of the vehicle body detected by the G sensor 102.

As explained above, in the vehicle suspension system according to the first embodiment, the two coils of the respective two electromagnetic absorbers 30 that correspond to each wheel pair consisting of the corresponding two diagonally located wheels are connected to form the closed loop, the effect of suppressing the bounce vibration of the vehicle and the effects of suppressing the roll vibration and the pitch vibration of the vehicle can be made different from each other.

Second Embodiment

In a vehicle suspension system according to a second embodiment, it is possible to selectively establish a state in which one electromagnetic absorber alone can generate a damping force and a state in which an appropriate vibration suppressing action can be exhibited with respect to the vibration with the coupled motion, by connecting the coil of the above-indicated one electromagnetic absorber and the coil of any of the other three electromagnetic absorbers.

Figure 6:
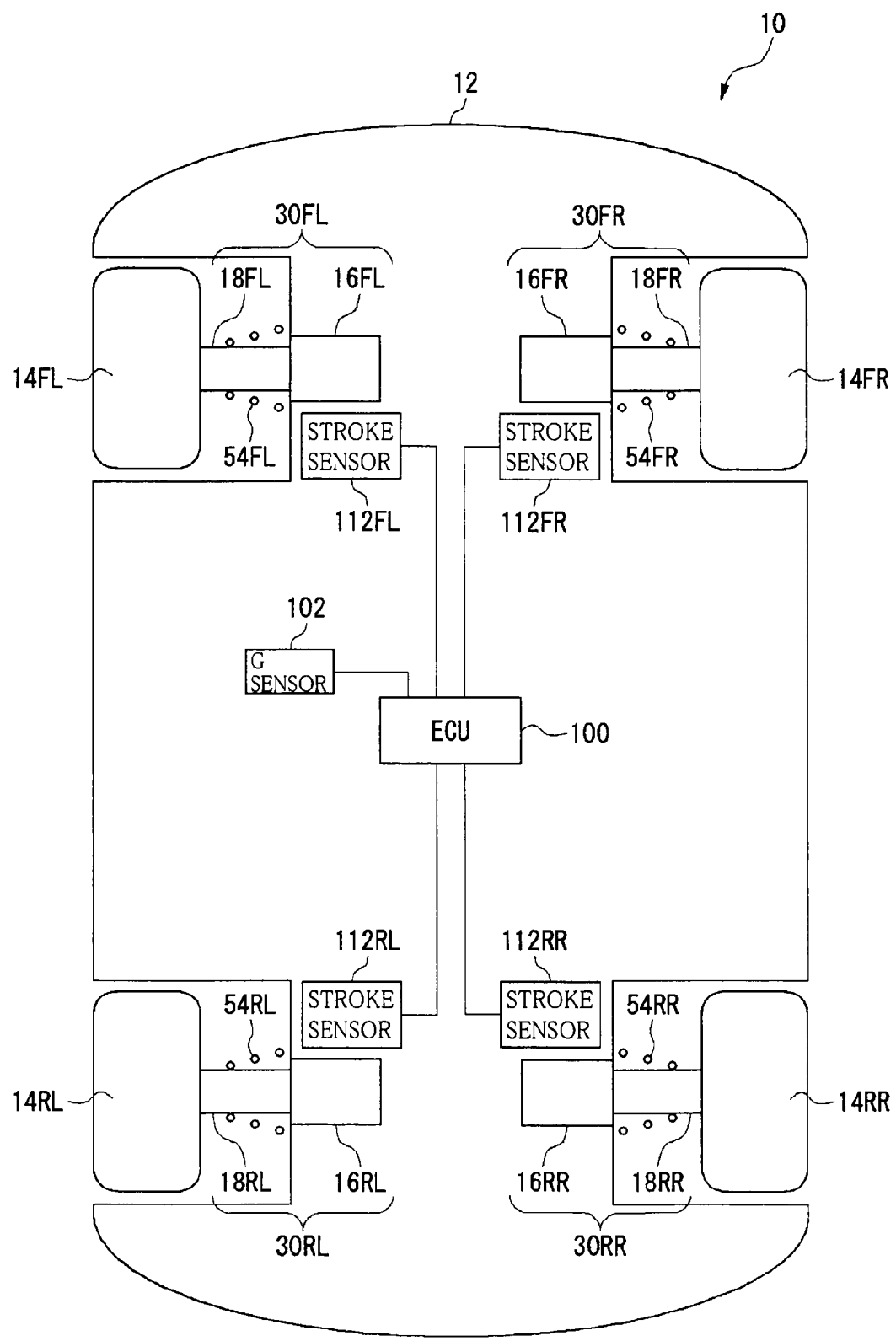
FIG. 6 is a schematic view showing a vehicle equipped with a suspension system according to a second embodiment of the claimable invention.

FIG. 6 is a schematic view of a vehicle 10 equipped with the suspension system according to the second embodiment. The wheels 14, the electromagnetic absorbers 30 each including the motor 16 and the cylinder device 18, the G sensor 102 and so on, are identical in construction with the corresponding components in the illustrated first embodiment, and a detailed description of which is dispensed with by using the same reference numerals as used in the first embodiment.

In the present suspension system, the electromagnetic absorbers 30 disposed at the respective four wheel positions include stroke sensors 112FR, 112FL, 112RR, and 112RL, respectively, each as a stroke-amount detector for detecting a stroke amount which is an amount of the relative movement of the outer tube 50 and the inner tube 42 (that corresponds to an amount of change in the length of the cylinder device 18). Hereinafter, the stroke sensors 112FR, 112FL, 112RR, and 112RL may be collectively referred to as "stroke sensor(s) 112" where appropriate. A signal detected by the stroke sensor 112 is sent to the ECU 100. In this connection, the stroke amount represents an amount of the relative movement of the sprung portion and the unsprung portion, and is one sort of a motion-state index amount indicative of a state of a motion of a part of the vehicle. Accordingly, the stroke sensor 112 functions as a motion-state-index-amount detecting device.

The ECU 100 is configured to judge, based on the signals detected by the respective stroke sensors 112, a mode of the vibration such as the bounce vibration, the roll vibration, the pitch vibration, and a composite vibration of the roll vibration and the pitch vibration. More specifically, the ECU 100 is configured to judge that those vibrations are within a resonance range in a vibration frequency.

Figure 7:
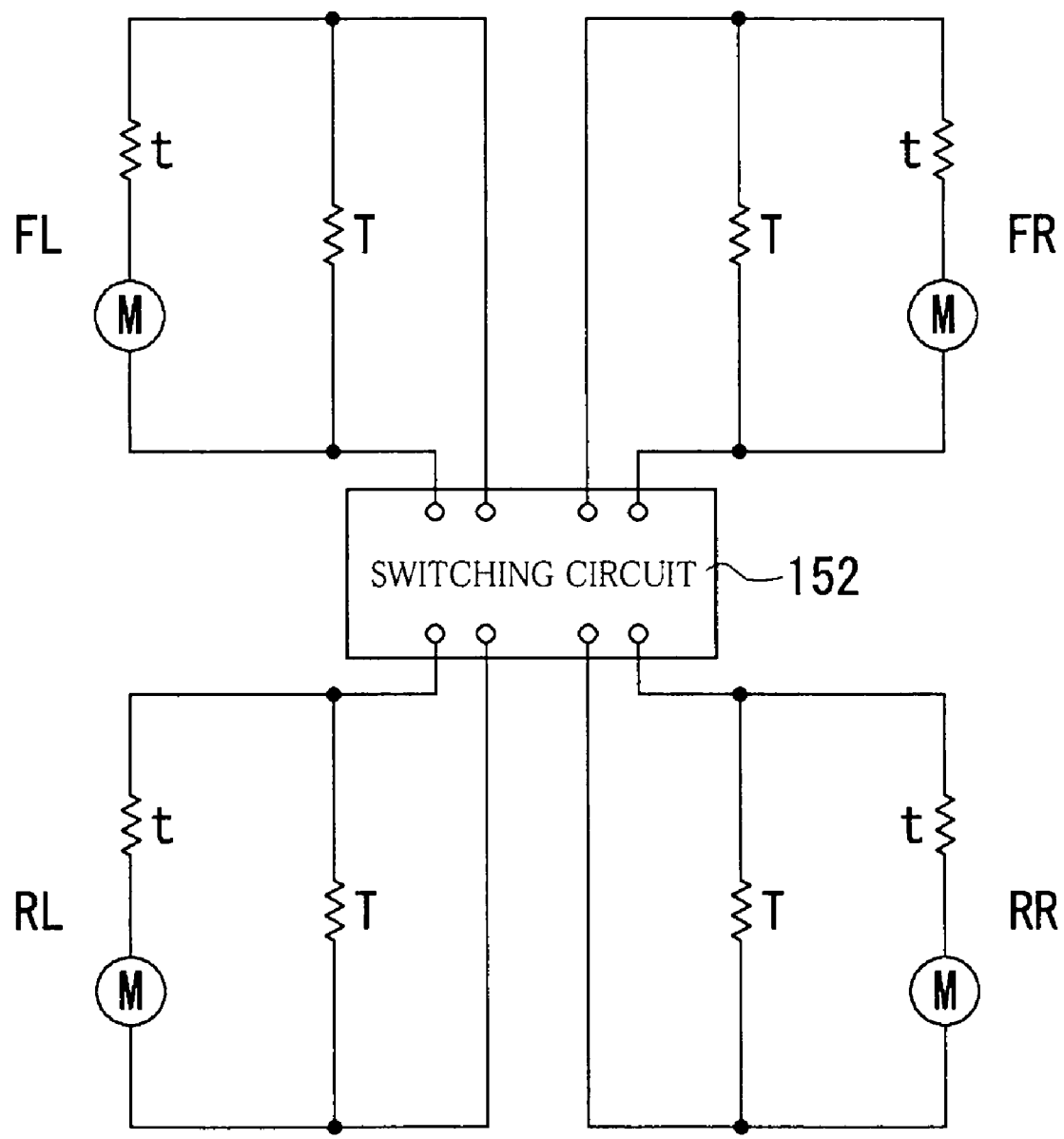
FIG. 7 is a view showing a configuration as to connection of coils of respective electromagnetic absorbers in the suspension system of the second embodiment.

FIG. 7 shows a configuration as to connection of the coils of the respective electromagnetic absorbers 30 in the suspension system according to the second embodiment. In FIG. 7, "FR", "FL", "RR", and "RL" respectively represent the coils of the electromagnetic absorbers 30FR, 30FL, 30RR, and 30RL at the respective wheels 14FR, 14FL, 14RR, and 14RL. As shown in FIG. 7, a resistor T is juxtaposed with each of the coils FR, FL, RR, and RL. The coil in each electromagnetic absorber 30 and the resistor T cooperates with each other to form a closed loop. In the present suspension system, each electromagnetic absorber 30 is constructed to include a damping-force generating device including the resistor T.

Opposite ends of the closed loop, more specifically, opposite ends of each coil FR, FL, RR, RL, are connected to a switching circuit 152 functioning as a coil connecting device. The switching circuit 152 is constructed such that any one of the coils is connectable to any of the other three coils. For instance, the switching circuit 152 allows the coil FR to be connected to any of the coils FL, RL, and RR so as to form a closed loop including the connected two coils. Further, two closed loops can be formed. For instance, the switching circuit 152 may be constructed to connect the coil FR and the coil RL to form one closed loop including the coils FR, RL and, at the same time, to connect the coil FL and the coil RR to form another closed loop including the coils FL, RR.

Figure 8:
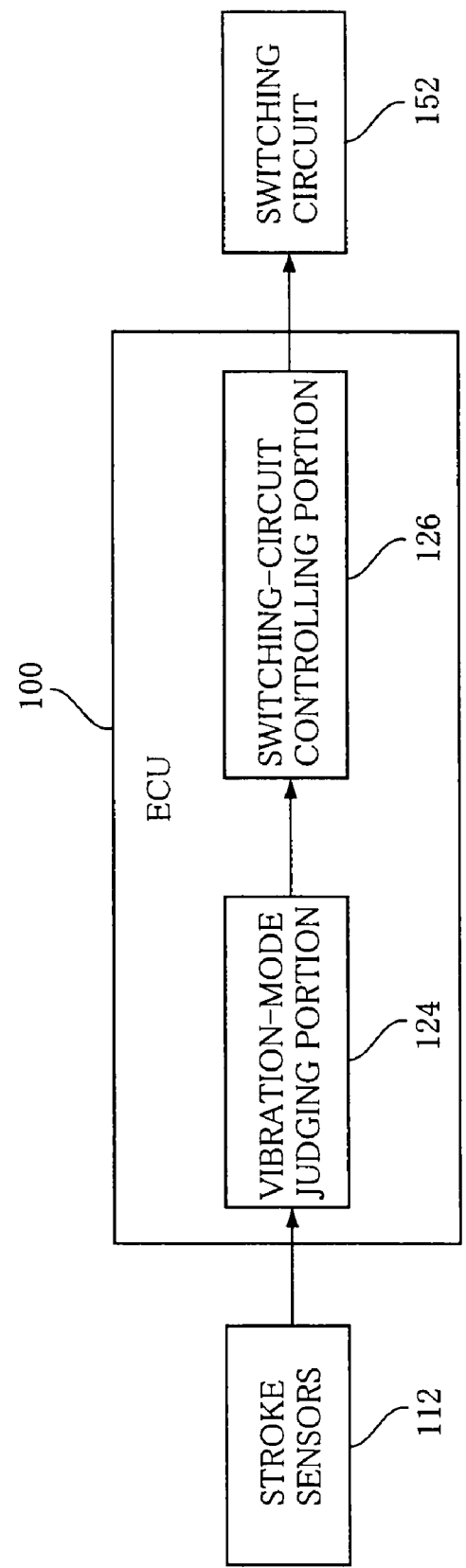
FIG. 8 is a functional block diagram focusing on an electronic control device of the suspension system of the second embodiment.

FIG. 8 is a functional block diagram focusing on the ECU 100 in the present suspension system. Each block in the ECU 100 is realized by a mechanical device or elements of a computer such as a CPU and a memory, in terms of hardware, and by computer programs or the like, in terms of software. Here, each block in the ECU 100 is shown as a functional block realized by a combination of those. Accordingly, it is to be understood for one having ordinary skill in the art that each functional block can be realized in various forms by a combination of suitable hardware and suitable software.

A vibration-mode judging portion 124 is configured to judge a mode of the vibration that is outstanding in the vehicle body 12, on the basis of the signals detected by the stroke sensors 112 at the respective four wheel positions. In the present suspension system, the vibration to be suppressed include: the pitch vibration; the roll vibration; a first diagonal vibration in which a direction of the relative movement of the sprung portion and the unsprung portion for the front left wheel is opposite to a direction of the relative movement of the sprung portion and the unsprung portion for the rear right wheel; and a second diagonal vibration in which a direction of the relative movement of the sprung portion and the unsprung portion for the front right wheel is opposite to a direction of the relative movement of the sprung portion and the unsprung portion for the rear left wheel. Where the vibration-mode judging portion 124 judges that each of those vibrations is in a resonance frequency or in a frequency around the resonance frequency, the vibration-mode judging portion 124 determines that the vibration in a pitch-vibration mode, a roll-vibration mode, a first-diagonal-vibration mode, or a second-diagonal-vibration mode is being generated.

The vibration-mode judging portion 124 calculates, according to the following formulas, a component amount of each vibration generated in the vehicle, ie., a pitch amount, a roll amount, a first diagonal difference amount that is equal to a difference between: the amount of the relative movement of the sprung portion and the unsprung portion for the front left wheel; and the amount of the relative movement of the sprung portion and the unsprung portion for the rear right wheel, and a second diagonal difference amount that is equal to a difference between: the amount of the relative movement of the sprung portion and the unsprung portion for the front right wheel; and the amount of the relative movement of the sprung portion and the unsprung portion for the rear left wheel:

$$\text{Pitch amount} = (X_{FL} + X_{FR})/2 - (X_{RL} + X_{RR})/2$$

$$\text{Roll amount} = (X_{FL} + X_{RL})/2 - (X_{FR} + X_{RR})/2$$

$$\text{First diagonal difference amount} = (X_{FL} - X_{RR})$$

$$\text{Second diagonal difference amount} = (X_{FR} - X_{RL})$$

wherein "X" represents the stroke amount detected by the stroke sensor 112 and the subscripts represent the respective four wheel positions. Each of the first diagonal difference amount and second diagonal difference amount may be considered as a motion amount that corresponds to the composite motion of the pitch motion and the roll motion. More specifically explained, the first diagonal difference amount indicates an amount of swinging in a perpendicular plane that includes a line connecting the front left (FL) portion and the rear right (RR) portion of the vehicle while the second diagonal difference amount indicates an amount of swinging in a perpendicular plane that includes a line connecting the front rear (FR) portion and the rear left (RL) portion of the vehicle.

The vibration-mode judging portion 124 judges whether the vibration in the above-indicated pitch-vibration mode, roll-vibration mode first-diagonal-vibration mode, or second-diagonal-vibration mode is being generated, on the basis of changes with passage of time in the calculated pitch amount, roll amount, first diagonal difference amount, or second diagonal difference amount.

In the suspension system according to the second embodiment, the vibration mode is judged on the basis of the stroke amount at each wheel position. The vibration mode may be judged otherwise. For instance, an acceleration detector may be disposed at each wheel position for detecting at least one of the vertical acceleration of the sprung portion and the vertical acceleration of the unsprung portion. On the basis of changes with passage of time in at least one of the vertical acceleration of the sprung portion and the vertical acceleration of the unsprung portion detected by the acceleration detector, the vibration-mode judging portion 124 may judge whether the vibration in any of the pitch-vibration mode, the roll-vibration mode, the first-diagonal-vibration mode, and the second-diagonal-vibration mode is being generated. Each of the vertical acceleration of the sprung portion and the vertical acceleration of the unsprung portion is one sort of the motion-state index amount described above. An arrangement that employs such a judging method is a sort of the arrangement in which the mode of the vibration is judged based on the motion-state index amount.

A switching-circuit controlling portion 126 is a functional portion for controlling the operation of the switching circuit 152 described above and functions as a coil-connecting-device control portion. When the vibration in any of the above-indicated vibration modes is being generated, the switching-circuit controlling portion 126 controls, on the basis of the judgment result by the above-indicated vibration-mode judging portion 124, the switching circuit 152 to connect the coils of the specific electromagnetic absorbers 30 such that a comparatively large damping force is generated with respect to the vibration being generated.

Figure 9:
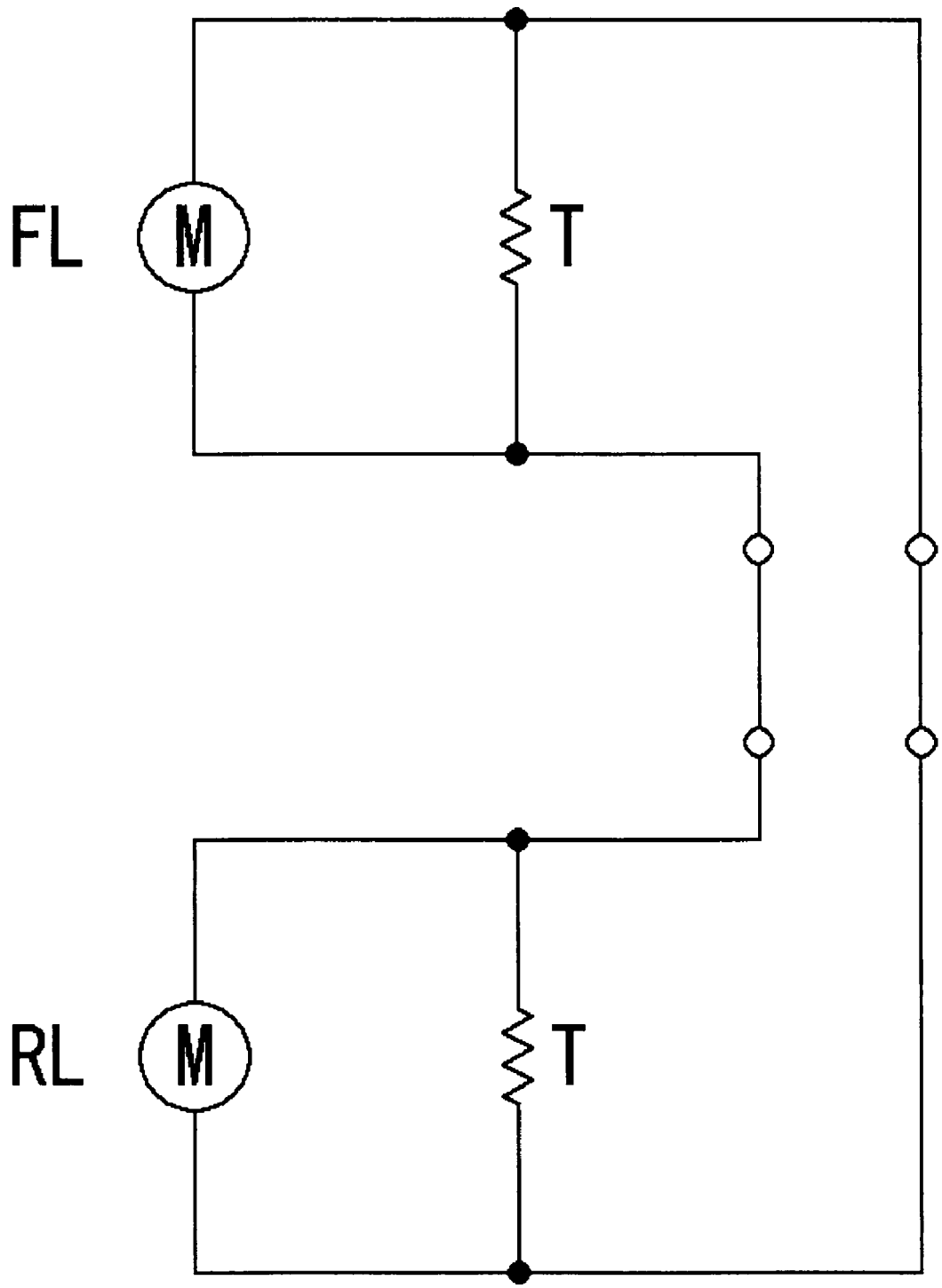
FIG. 9 is a view showing a circuit in a state in which a coil of the electromagnetic absorber provided for a front left wheel and a coil of the electromagnetic absorber provided for a rear left wheel are connected in the suspension system of the second embodiment.

The switching circuit 152 is normally kept in a state in which any one of the coils is not connected to any of the other three coils and each of the coils independently forms a closed loop together with the corresponding resistor T juxtaposed with the coil. For instance, the switching-circuit controlling portion 126 connects the coils FL and RL and the coils FR and RR when the vibration in the pitch-vibration modes is being generated. FIG. 9 shows a circuit in which the coils FL and RL of the respective two electromagnetic absorbers 30FL and 30RL provided for the left-side wheels are connected. The circuit shown in FIG. 9 is equivalent to a circuit shown in FIG.

Figure 10:
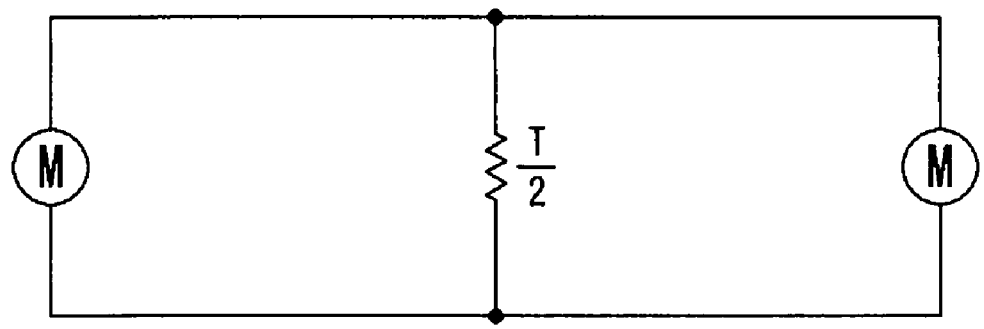
FIG. 10 is a view showing a circuit equivalent to the circuit of FIG. 9.

10. Accordingly, a resistance value of the resistor provided in the circuit of FIG. 10 is half the resistance value of the resistor T disposed in parallel with each of the coils of the respective electromagnetic absorbers 30.

Where the internal resistance of each coil is t, the resistance value of the resistor disposed in parallel with each coil is T, and the electromotive force to be generated by each motor is e, the current i that passes through each coil is a value indicated by the following formula, when the switching circuit 152 is in the normal state, namely, when the coils are not connected:

$$i=e/(t+T)$$

On the other hand, in the case where the coils FL and RL of the respective two electromagnetic absorbers 30FL and 30RL are connected, the current i that passes through each coil is equal to a value determined by the above formula, namely, the same value in the state in which the coils FL and RL are not connected, when the external forces having mutually the same magnitude are applied respectively to the two electromagnetic absorbers 30FL and 30RL in the same direction. On the contrary, the current i that passes through each coil FL, RL is a value indicated by the following formula, when the external forces having mutually the same magnitude are applied respectively to the two electromagnetic absorbers 30FL and 30RL in the mutually opposite directions:

$$i=e/t$$

Accordingly, when the coils are connected, the amount of current that passes through the coils increases, and the damping force to be generated by each of the two electromagnetic absorbers 30 having the coils upon application of the external forces in the opposite directions becomes larger than that in the normal state. In the light of this, the coils are connected as indicated in the table of FIG. 11 depending on the vibration mode, to deal with the vibrations in various modes. More specifically explained, where the vibration is in the pitch-vibration mode, the coils FL and RL of the respective two electromagnetic absorbers 30FL and 30RL provided for the left-side wheels are connected and, at the same time, the coils FR and RR of the respective two electromagnetic absorbers 30FR and 30RR provided for the right-side wheels are connected. Where the vibration is in the roll-vibration mode, the coils FR and FL of the respective two electromagnetic absorbers 30FR and 30FL provided for the front-side wheels are connected and, at the same time, the coils RL and RR of the respective two electromagnetic absorbers 30RL and 30RR provided for the rear-side wheels are connected. Where the vibration is in the first-diagonal-vibration mode, the coil FL of the electromagnetic absorber 30FL provided for the front left wheel is connected to the coil RR of the electromagnetic absorber 30RR provided for the rear right wheel. Where the vibration is in the second-diagonal-vibration mode, the coil FR of the electromagnetic absorber 30FR provided for the front rear wheel is connected to the coil RL of the electromagnetic absorber 30RL provided for the rear left wheel.

As a modified example of the present suspension system, there may be constructed a system in which the switching circuit 152 is configured such that all of the coils are normally placed in the connected state and such that, when it is judged that the vibration in any one of the vibration modes is being generated, the connection of the coils corresponding to the judged vibration mode is maintained while the other connections of the coils are cut off. More specifically described, where it is judged that the vibration in the first-diagonal-vibration mode is being generated, for instance, the switching circuit 152 in the modified suspension system is configured to cut off the connection associated with the coils FR and the connection associated with the coils RL and to maintain only the connection of the coils FL and RR, thereby increasing the current that passes through those two coils FL and RR.

As explained above, in the suspension system according to the second embodiment, the mode of the vibration that is being outstandingly generated in the vehicle body is judged, and the coils of the electromagnetic absorbers 30 are connected in suitable combinations to suppress the vibration in the judged mode. The thus constructed suspension system is capable of effectively damping the vibration generated in the vehicle body.

Third Embodiment

In a suspension system according to a third embodiment, a control mode of each of the four electromagnetic absorbers is selectively changeable between: a control (so-called "passive control") in which the damping force is generated mainly by utilizing the electromotive force generated by the motor 16; and a control (so-called "active control") that allows the above-indicated power-reception operation in which the damping force or the impulsive force is generated by supplying the electric power from the power source to the motor 16.

Figure 12:
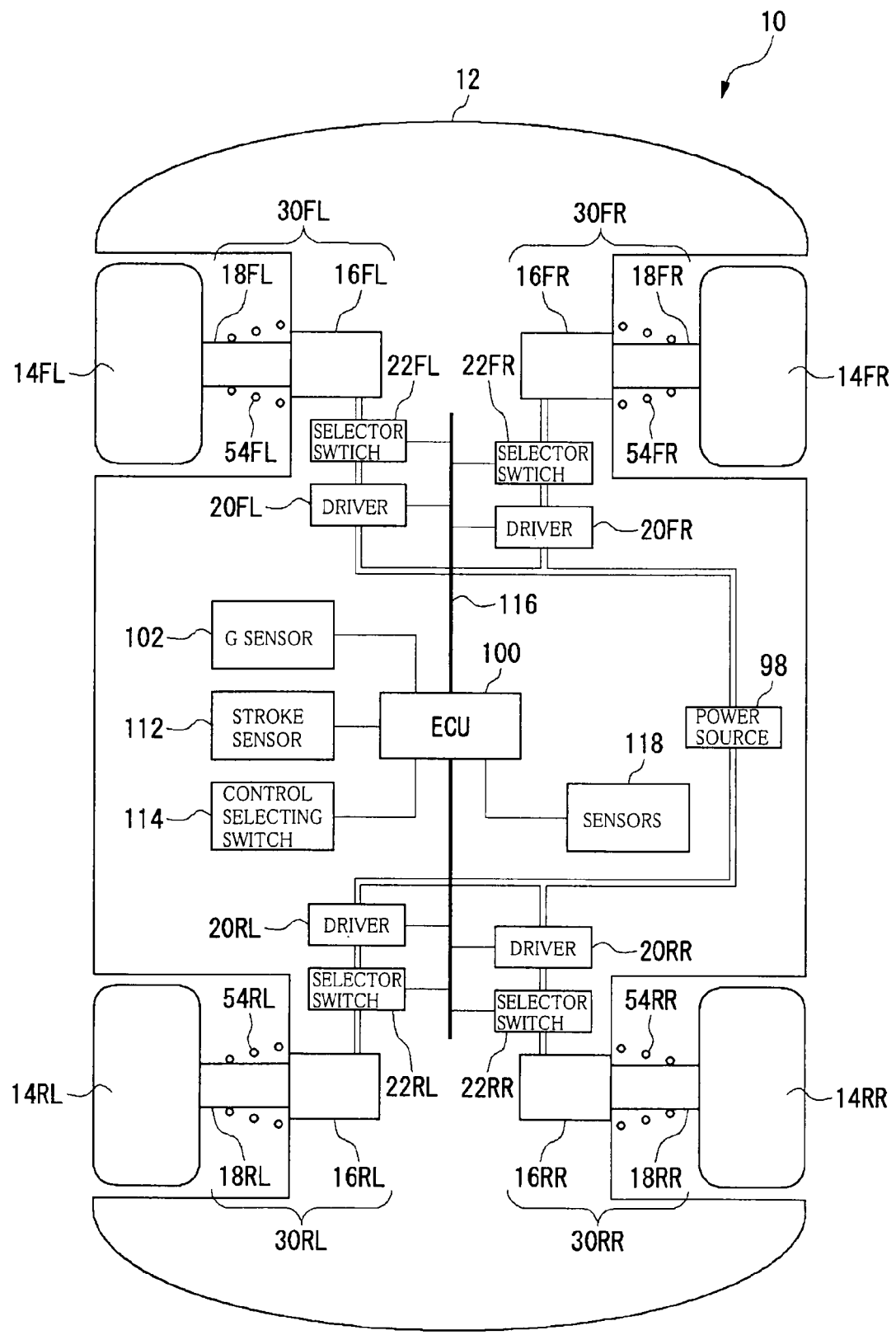
FIG. 12 is a schematic view showing a vehicle equipped with a suspension system according to a third embodiment of the claimable invention.

FIG. 12 is a schematic view of a vehicle 10 equipped with the suspension system according to the third embodiment. The wheels 14, the electromagnetic absorbers 30 each including the motor 16 and the cylinder device 18, the G sensor 102, the stroke sensors 112 and so on, are identical in construction with the corresponding components in the illustrated first or second embodiment, and a detailed description of which is dispensed with by using the same reference numerals as used in the first or second embodiment.

The present suspension system includes drivers 20FR, 20FL, 20RR, 20RL (hereinafter collectively referred to as "driver(s) 20" where appropriate) each of which is a drive circuit and which correspond to the respective electromagnetic absorbers 30FR, 30FL, 30RR, 30RL. The driver 20 is constituted by including: a ROM which stores control programs for driving the motor, data indicative of various constants used in the control by the driver 20, and the like; a CPU which controls the electromagnetic absorber 30, specifically, driving of the motor 16, by executing the control programs stored in the ROM and which performs a communication control with the ECU 100; a RAM which temporarily stores calculation results made by the CPU; and a signal generator for driving the motor.

A power source 98 supplies, to the driver 20, electric power for driving the motor 16. The power source 98 is a 36V-battery provided in the vehicle body 12.

Each driver 20 is communicably connected to the ECU 100 via a communication bus 116, and is configured to adjust the signal generator such that the corresponding motor 16 operates in accordance with a motor drive signal sent from the ECU 100 and to supply an electric current form the power source 98 to that motor 16. The ECU 100 and each driver 20 are constructed to repeat bidirectional communication therebetween at certain time intervals.

The present suspension system includes four selector switches 22FR, 22FL, 22RR, 22RL (hereinafter collectively referred to as "selector switch(es) 22" where appropriate) which correspond to the respective electromagnetic absorbers 30FR, 30FL, 30RR, 30RL. Each selector switch 22 functions as a connection selector configured to permit the coil of the motor 16 of a corresponding one of the electromagnetic absorbers 30 to form a closed loop independently of the other coils or to permit the coil to be connected to a corresponding one of the drivers 20. Each selector switch 22 is communicably connected to the ECU 100 via the communication bus 116, and is configured to be operated in accordance with a signal sent from the ECU 100.

A control selecting switch 114 provided in the present suspension system is disposed within a compartment of the vehicle for permitting a vehicle operator to select one of the above-indicated passive control and active control, based on a preference, namely, an intention, of the vehicle operator. Information on the manipulation of the control selecting switch 114 is sent to the ECU 100.

The vehicle body 12 is further equipped with a sensor 118 for detecting the motion state of the vehicle and the operational states of various devices and equipments installed on the vehicle. While the sensor 118 is collectively indicated in FIG. 11, the sensor 118 includes a voltage detecting circuit for detecting a remaining amount of the battery as the power source 98, a vehicle-speed sensor for detecting a running speed of the vehicle 10 (vehicle speed), a steering-angle sensor for detecting a steering angle of the vehicle 10. In this connection, each of the vehicle speed and the steering angle is one sort of the motion-state index amount indicative of the state of the motion of the vehicle, and accordingly, each of the vehicle-speed sensor and the steering-angle sensor functions as a motion-state-index-amount detecting device.

The ECU 100 determines the control mode of the electromagnetic absorbers 30 to be one of the passive control and the active control, on the basis of the motion state of the vehicle estimated from the result of detection by the sensor 118 or the manipulation state of the control selecting switch 114 by the vehicle operator. In accordance with the determination, the ECU 100 sends a signal to the drivers 20 and the selector switches 22. When the active control is executed, the ECU 100 judges the state of the vehicle 10, specifically, the state of the vibration being generated in the vehicle, on the basis of the signals detected by various sensors such as the stroke sensors 112, and determines a force to be generated by each of the electromagnetic absorbers 30 provided for the respective four wheels, so as to suppress the vibration of the vehicle, changes in the vehicle posture, and unstable behavior of the vehicle and so as to stabilize the vehicle with respect to a steering operation, an accelerating operation, a braking operation and the like, by the vehicle operator. (An amount of the telescopic movement of each cylinder device 18 may be determined instead of the force to be generated by each electromagnetic absorber 30.) Further, the ECU 100 sends drive signals for driving the motors 16 to the respective drivers 20.

Figure 13:
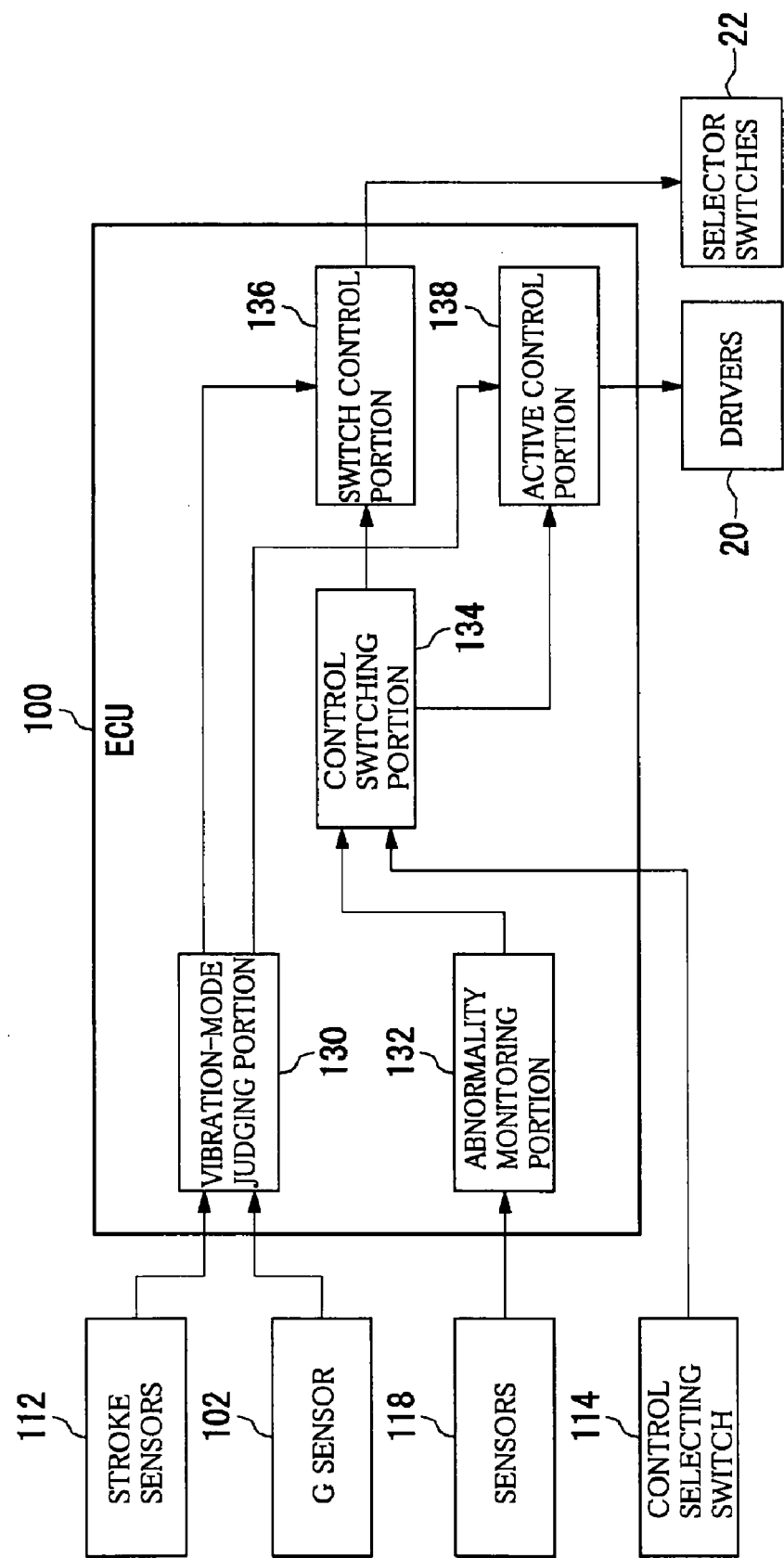
FIG. 13 is a functional block diagram focusing on an electronic control device of the suspension system of the third embodiment.

FIG. 13 is a functional block diagram of a control system focusing on the ECU 100. A vibration-mode judging portion 130 as a vibration-state judging portion judges the mode of the vibration outstanding in the vehicle on the basis of the signals detected by the stroke sensors 112 or the G sensor 102, in a manner similar to that in the suspension system according to the illustrated second embodiment.

An abnormality monitoring portion 132 monitors an occurrence of any abnormality that would hinder execution of the active control or the passive control, on the basis of the signals from various sensors 118.

A control switching portion 134 operates the switch control portion 136 and an active control portion 138 functioning as a power-reception-operation control portion, on the basis of the result of monitoring by the abnormality monitoring portion 132, thereby changing the control mode of the electromagnetic absorbers 30 between the passive control and the active control. Further, the control switching portion 134 receives a signal from the control selecting switch 114 and changes the control mode into any one of the two control modes selected by the vehicle operator, as long as no abnormality is detected by the abnormality monitoring portion 132.

The active control portion 138 controls each of the electromagnetic absorbers 30 to generate the impulsive force or the damping force with respect to the relative movement of the sprung portion and the unsprung portion, in a state in which each electromagnetic absorber 30 receives the electric power from the power source 98. That is, the active control portion 138 is a functional portion operable to control the power-reception operation of each electromagnetic absorber 30. More specifically explained, the active control portion 138 receives from the vibration-mode judging portion 130 an amount of the vibration in the outstanding vibration mode, calculates the impulsive force or the damping force that should be generated by each of the electromagnetic absorbers 30 disposed at the respective four wheel positions for suppressing the vibration in the outstanding mode, and sends the drive signals to the respective drivers 20 for damping the vibration of the vehicle body and stabilizing the vehicle with respect to the steering of the vehicle by the vehicle operator.

A switch control portion 136 as a connection-selector control portion controls, depending upon the control mode, the connection switches 22 such that the operation of each electromagnetic absorber 30 in one of the passive control and the active control is realized on the basis of the determination by the control switching portion 134. Explained in more detail, when the control mode is changed by the control switching portion 134 into the passive control, the switch control portion 136 controls the connection switches 22 such that each of the coils of the respective electromagnetic absorbers 30 disposed at the respective wheel positions independently forms a closed loop, namely, such that each electromagnetic absorber 30 generates the damping force independently and is in the state in which no electric power is supplied from the power source 98. When the control mode is changed by the control switching portion 134 into the active control, the switch control portion 136 controls the connection switches 22 such that the coils of the respective electromagnetic absorbers 30 are respectively connected to the corresponding drivers 20.

The control switching section 134 may be configured such that each of the coils of the motors 16 of the respective electromagnetic absorbers 30 is normally connected to the corresponding driver 20. In this instance, each electromagnetic absorber 30 executes the active control. When the active control cannot be executed due to wire breakage or the like, the control mode is changed from the active control into the passive control, whereby each electromagnetic absorber 30 can at least independently generate the damping force. Further, when the abnormality monitoring portion 132 detects a decrease in the voltage of the power source 98, more specifically, when the source voltage becomes lower than the prescribed threshold voltage, the control mode is changed into the passive control to prohibit the power-reception operation of each electromagnetic absorber 30, thereby obviating a decrease in the response of the motor 16 and a shortage of the damping force, due to the voltage decrease.

When the passive control is executed, namely, in a state in which each of the coils of the respective electromagnetic absorbers 30 independently forms the closed loop, the motor 16 works as the generator and generates a damping force whose magnitude is substantially proportional to the stroke speed, i.e., the speed of the relative movement of the sprung portion and the unsprung portion. When the abnormality monitoring portion 132 detects that there is being generated in the vehicle body, during the passive control, an excessive vibration which deteriorates adhesion of the wheels to the road surface, the control switching portion 134 controls the switch control portion 136 to change the control mode from the passive control to the active control. In this manner, the vibration of the vehicle can be effectively damped by the active control, thereby recovering the adhesion of the wheels.

As explained above, in the suspension system according to the third embodiment, the control mode of each electromagnetic absorber 30 is changeable between: the passive control in which the motor 16 of the electromagnetic absorber 30 is used mainly as the generator to generate the damping force; and the active control in which the motor 16 is driven by supplying the electric power thereto to thereby actively operate the cylinder device. Accordingly, the present suspension system is capable of exhibiting an appropriate vibration damping performance depending upon the state of the vehicle.

<Modifications>

While the claimable invention has been described based on some embodiments for illustrative purpose. It is to be understood for a person having ordinary skill in the art that various other modifications may be employed in combinations of various constituent elements and combinations of various processing and that the modifications are within the scope of the invention. Hereinafter, the modifications will be described.

In the suspension system according to the illustrated third embodiment, the selector switch 22 may be configured to permit any one of the coils of the respective four electromagnetic absorbers 30 to be connected to any one of the coils of the other three electromagnetic absorbers 30 to form the closed loop.

In the suspension system according to each of the illustrated embodiments, there has been explained the electromagnetic absorber 30 having the damping-force generating device that employs the motor 16 of a rotary type. The present invention is applicable to an electromagnetic absorber having a damping-force generating device that employs a motor of a linear type. Where the linear motor is employed, the electromagnetic absorber may be constructed as follows, for instance. A plurality of coils are disposed on an inner surface of the outer tube so as to arrange in the axial direction of the outer tube over a suitable axial length, and a plurality of permanent magnets are disposed on an outer surface of the inner tube so as to arrange in the axial direction of the inner tube over a suitable axial length. The outer tube and the inner tube are supported such that the outer and inner tubes are movable relative to each other in the vertical direction without contacting each other.

In the thus constructed electromagnetic absorber, when the outer tube and the inner tube, namely, the coils and the permanent magnets, are moved relative to each other, the magnetic flux in the coils changes, so that the current is generated, that is, the linear motor works as the generator, thus generating a damping force between the coils and the permanent magnets.

The invention claimed is:

1. A suspension system for a vehicle comprising:
four electromagnetic absorbers which respectively correspond to four wheels of the vehicle and each of which includes:
(A) a sprung-side member coupled to a sprung portion;
(B) an unsprung-side member coupled to an unsprung portion and operable to move relative to the sprung-side member in association with a relative movement of the sprung portion and the unsprung portion; and (C) a damping-force generating device including a coil and a magnet that move relative to each other in association with a relative movement of the sprung-side member and the unsprung-side member and operable to generate a damping force with respect to the relative movement of the sprung-side member and the unsprung-side member depending on an electromotive force generated by a relative movement of the coil and magnet; and
a coil connecting device configured to electrically connect the coils of the damping-force generating devices of the respective four electromagnetic absorbers so as to form two closed loops which respectively correspond to two wheel pairs each consisting of diagonally located two of the four wheels and each of which includes two coils, of the respective damping-force generating devices of two of the four electromagnetic absorbers, which two electromagnetic absorbers are provided for a corresponding one of the two wheel pairs,
wherein the coil connecting device includes: two first connection paths which electrically connect first ends of the respective two coils in each of the respective two closed loops and which are joined to each other; and two second connection paths which electrically connect second ends of the respective two coils in each of the respective two closed loops and which are joined to each other, each of the second ends being opposite to a corresponding one of the first ends.

2. The suspension system according to claim 1, wherein the coil connecting device is configured to connect the two coils constituting one of the two closed loops so as to cause current flows in mutually different directions in the one of the two closed loops, depending on the electromotive forces generated in the respective damping-force generating devices of corresponding two of the four electromagnetic absorbers, when a direction of the relative movement of the sprung portion and the unsprung portion on which is disposed one of the two electromagnetic absorbers that respectively correspond to the two coils constituting the one of the two closed loops is the same as a direction of the relative movement of the sprung portion and the unsprung portion on which is disposed the other of the two electromagnetic absorbers.

3. The suspension system according to claim 1, wherein the connecting device further includes a resistor disposed to join at least one of the two first connection paths and at least one of the two second connection paths to each other.

4. The suspension system according to claim 3, wherein the resistor is a variable resistor.

5. The suspension system according to claim 1, wherein the coil connecting device is configured to connect the two coils constituting one of the two closed loops so as to cause current flows in the same direction in the one of the two closed loops, depending on the electromotive forces generated in the respective damping-force generating devices of corresponding two of the four electromagnetic absorbers, when a direction of the relative movement of the sprung portion and the unsprung portion on which is disposed one of the two electromagnetic absorbers that respectively correspond to the two coils constituting the one of the two closed loops is different than a direction of the relative movement of the sprung portion and the unsprung portion on which is disposed the other of the two electromagnetic absorbers.

6. The suspension system according to claim 1, wherein the damping-force generating device is a motor including a stator formed by an core and a coil wrapped around the core, and a rotor with a cylindrical surface on which a magnet is attached and which is rotatably opposed to the stator, and
wherein an output shaft coupled to the rotor of the motor is disposed within the sprung-side member.

7. The suspension system according to claim 6, wherein the output shaft is integral with a threaded rod which engages a nut, and
   wherein the nut is fixedly supported by a nut supporting member disposed within the unsprung-side member.

8. The suspension system according to claim 7, wherein the nut supporting member is disposed so as to extend upright from a bottom portion of the unsprung-side member.

* * * * *